United States Patent

Lerner

[15] 3,689,698

[45] Sept. 5, 1972

[54] MULTIPLEXING SYSTEM

[72] Inventor: Theodore Lerner, Williamsville, N.Y.

[73] Assignee: Textron Inc., Providence, R.I.

[22] Filed: April 7, 1971

[21] Appl. No.: 131,856

[52] U.S. Cl......179/15 BW, 179/15 AP, 179/15 BA, 178/50

[51] Int. Cl...............................................H04j 3/04

[58] Field of Search......179/15 BW, 15 AP, 15.55 R, 179/15 BA; 340/347 DD; 178/DIG. 3, 50

[56] References Cited

UNITED STATES PATENTS

| | | | |
|---|---|---|---|
| 3,347,981 | 10/1967 | Kagan | 178/DIG. 3 |
| 3,618,047 | 11/1971 | Hertz | 340/347 DD |

*Primary Examiner*—Ralph D. Blakeslee
*Attorney*—Bean & Bean

[57] ABSTRACT

Successive frames of a binary bit stream which is a multiplexed series of binary words derived from the amplitude levels of a large number of voice channels each may be represented by a series of binary words which locate the occurrence of "ones" in each frame. The number of "ones" in each frame is related to the probability of occurrence of the sampled amplitude levels such that these "ones" occur infrequently. Thus, the binary words or location numbers which represent each frame contain fewer bits than the number of bits constituting each frame. By transmitting these location numbers and then reconstructing the original bit stream from them, the data rate required of the transmission system is very much reduced; or, for a given available data rate, more voice channels may be accommodated; or, for a given available data rate and a given number of voice channels, the fidelity of the system may be increased.

37 Claims, 41 Drawing Figures

INVENTOR.
THEODORE LERNER

BY

Bean & Bean
ATTORNEYS

STATISTICAL DISTRIBUTION OF VOICE-SIGNAL LEVELS IN TWO-WAY CONVERSATION

| LEVEL | BINARY REPRESENTATION | PROBABILITY OF OCCURRENCE |
|---|---|---|
| 1 | 00001 | 0.00046 |
| 2 | 00010 | 0.00019 |
| 3 | 00011 | 0.00026 |
| 4 | 00100 | 0.00037 |
| 5 | 00100 | 0.00058 |
| 6 | 00110 | 0.00084 |
| 7 | 00111 | 0.00117 |
| 8 | 01000 | 0.00166 |
| 9 | 01001 | 0.00253 |
| 10 | 01010 | 0.00392 |
| 11 | 01011 | 0.00593 |
| 12 | 01100 | 0.00917 |
| 13 | 01101 | 0.01361 |
| 14 | 01110 | 0.02201 |
| 15 | 01111 | 0.05058 |
| 16 | 10000 | 0.78550 |
| 17 | 10001 | 0.04325 |
| 18 | 10010 | 0.01975 |
| 19 | 10011 | 0.01230 |
| 20 | 10100 | 0.00799 |
| 21 | 10101 | 0.00530 |
| 22 | 10110 | 0.00342 |
| 23 | 10111 | 0.00230 |
| 24 | 11000 | 0.00160 |
| 25 | 11001 | 0.00113 |
| 26 | 11010 | 0.00084 |
| 27 | 11011 | 0.00061 |
| 28 | 11100 | 0.00045 |
| 29 | 11101 | 0.00033 |
| 30 | 11110 | 0.00024 |
| 31 | 11111 | 0.00077 |

FIG. 2.

INVENTOR.
THEODORE LERNER
BY
Beam & Beam
ATTORNEYS

MODIFIED BINARY CODING OF SIGNAL LEVELS

| LEVEL | PROPOSED BINARY REPRESENTATION | PROBABILITY OF OCCURRENCE |
|---|---|---|
| 1 | 01111 | 0.00046 |
| 2 | 11110 | 0.00019 |
| 3 | 11101 | 0.00026 |
| 4 | 00111 | 0.00037 |
| 5 | 10011 | 0.00058 |
| 6 | 10110 | 0.00084 |
| 7 | 10101 | 0.00117 |
| 8 | 00110 | 0.00166 |
| 9 | 00101 | 0.00253 |
| 10 | 01100 | 0.00392 |
| 11 | 01010 | 0.00593 |
| 12 | 01001 | 0.00917 |
| 13 | 10000 | 0.01361 |
| 14 | 00100 | 0.02201 |
| 15 | 00001 | 0.05058 |
| 16 | 00000 | 0.78550 |
| 17 | 00010 | 0.04325 |
| 18 | 01000 | 0.01975 |
| 19 | 10001 | 0.01230 |
| 20 | 10010 | 0.00799 |
| 21 | 10100 | 0.00530 |
| 22 | 11000 | 0.00342 |
| 23 | 00011 | 0.00230 |
| 24 | 11001 | 0.00160 |
| 25 | 11010 | 0.00113 |
| 26 | 11100 | 0.00084 |
| 27 | 01101 | 0.00061 |
| 28 | 01110 | 0.00045 |
| 29 | 01011 | 0.00033 |
| 30 | 11011 | 0.00024 |
| 31 | 10111 | 0.00077 |

FIG. 3

INVENTOR.
THEODORE LERNER
BY
Bean & Bean
ATTORNEYS

FIG. 4a

A SEQUENCE OF BINARY WORDS IN THE MODIFIED CODING 00000 00000 00010 00000 00000 00000 00000 00001 01000
00000 00000 00000 00000 00000 00000 01100 00000 00100
00000 00000 10000 00000 00000 00000 00000 00010 00000
00000 10000 00000 00000 00000 00000 01000 00000 00000

FIG. 4b

A SEQUENCE OF LOCATION NUMBERS DERIVED FROM FIG. 4a 14 26 2 31 5 1 10 13 28 12 26

FIG. 4c

A SEQUENCE OF BINARY WORDS REPRESENTING LOCATION NUMBERS 01110 11010 00010 11111 00101 00001 01010 01101 11100 01100 11010

INVENTOR.
THEODORE LERNER
BY
Bean & Bean
ATTORNEYS

INVENTOR.
THEODORE LERNER
BY
Bean & Bean
ATTORNEYS

INVENTOR.
THEODORE LERNER
BY
Bean & Bean
ATTORNEYS

FIG. 7

STATISTICAL DISTRIBUTION OF VOICE SIGNAL LEVELS IN TWO-WAY CONVERSATION

| LEVEL | BINARY REPRESENTATION | PROBABILITY OF OCCURRENCE |
|---|---|---|
| +15 | 11111 | .00038 |
| +14 | 11101 | .00018 |
| +13 | 11011 | .00022 |
| +12 | 11001 | .00032 |
| +11 | 10111 | .00017 |
| +10 | 10101 | .00071 |
| +9 | 10011 | .00098 |
| +8 | 10001 | .00141 |
| +7 | 01111 | .00205 |
| +6 | 01101 | .00318 |
| +5 | 01011 | .00486 |
| +4 | 01001 | .00742 |
| +3 | 00111 | .01117 |
| +2 | 00101 | .01709 |
| +1 | 00011 | .03093 |
| +0 | 00001 | .42120 |
| -0 | 00000 | .42380 |
| -1 | 00010 | .02705 |
| -2 | 00100 | .01535 |
| -3 | 00110 | .00984 |
| -4 | 01000 | .00656 |
| -5 | 01010 | .00424 |
| -6 | 01100 | .00278 |
| -7 | 01110 | .00195 |
| -8 | 10000 | .00132 |
| -9 | 10010 | .00098 |
| -10 | 10100 | .00072 |
| -11 | 10110 | .00032 |
| -12 | 11000 | .00039 |
| -13 | 11010 | .00029 |
| -14 | 11100 | .00023 |
| -15 | 11110 | .00066 |

INVENTOR.
THEODORE LERNER
BY
Bean & Bean
ATTORNEYS

FIG. 8a

A TYPICAL SEQUENCE OF BINARY VOICE SAMPLES

| 60 | 62 | 64 |
|---|---|---|
| 00000 | 00000 | 00000 |
| 00000 | 00001 | 00001 |
| 00001 | 00000 | 00001 |
| 00000 | 00000 | 00100 |
| 00001 | 00000 | 00001 |
| 00001 | 00010 | 00000 |
| 01011 | 00001 | 00000 |
| 00000 | 00001 | 00001 |
| 00001 | 66 10010 68 | 00011 |
| 00001 | 00000 | 00000 |
| 00000 | 00000 | 00001 |
| 00011 | 00001 | 00001 |
| 00001 | 00000 | 00000 |
| 00000 | 00001 | 00000 |
| 00000 | 00010 | 00000 |
| 00000 | 00001 | 00001 |
| 00001 | 00000 | 00101 |
| 00001 | 00000 | 00000 |
| 00101 | 01101 | 70 00001 |
| 00001 | 00001 | 72 00000 |

FIG. 8b

A SEQUENCE OF LOCATION NUMBERS DERIVED FROM FIG. 8a

29(0) 31(1) 8(1) 31(0) 2(1) 31(1) 10(1) 20(1) 5(0)
13(1) 10(1) 5(1) 14(0) 3(0) 6(0) 14(1) 0(0)

A SEQUENCE OF BINARY NUMBERS REPRESENTING THE LOCATION NUMBERS OF FIG. 8a 111010 111110 010001 111110 000101 111110 010101 101001
001010 011011 010101 001011 011100 000110 001100 011101
000000

FIG. 8c

INVENTOR.
THEODORE LERNER

BY

Bean & Bean
ATTORNEYS

INVENTOR
THEODORE LERNER

BY

Bean & Bean
ATTORNEYS

INVENTOR.
THEODORE LERNER
BY
Bean & Bean
ATTORNEYS

INVENTOR.
THEODORE LERNER

BY

Bean & Bean
ATTORNEYS

INVENTOR.
THEODORE LERNER

BY

Bean & Bean
ATTORNEYS

INVENTOR.
THEODORE LERNER
BY
Bean & Bean
ATTORNEYS

INVENTOR.
THEODORE LERNER
BY
Bean & Bean
ATTORNEYS

INVENTOR.

THEODORE LERNER

BY

Bean & Bean

ATTORNEYS

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| A | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| B | 0 | 0 | 1 | 1 | 0 | 0 | 0 | 0 | 1 | 1 | 0 | 0 | 0 | 0 | 1 | 1 | 0 | 0 | 0 | 0 | 1 | 1 | 0 | 0 |
| C | 0 | 0 | 0 | 0 | 1 | 1 | 0 | 0 | 0 | 0 | 1 | 1 | 0 | 0 | 0 | 0 | 1 | 1 | 0 | 0 | 0 | 0 | 1 | 1 |
| D | 0 | 0 | 0 | 0 | 0 | 0 | 1 | 1 | 1 | 1 | 1 | 1 | 0 | 0 | 0 | 0 | 0 | 0 | 1 | 1 | 1 | 1 | 1 | 1 |
| E | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 |

INVENTOR.
THEODORE LERNER

BY

Bean & Bean
ATTORNEYS

INVENTOR.

THEODORE LERNER

BY

Bean & Bean

ATTORNEYS

INVENTOR.
THEODORE LERNER

BY

Bean & Bean
ATTORNEYS

INVENTOR.
THEODORE LERNER

BY

Bean & Bean
ATTORNEYS

INVENTOR.
THEODORE LERNER

BY

Bean & Bean
ATTORNEYS

INVENTOR.
THEODORE LERNER
BY
Bean & Bean
ATTORNEYS

INVENTOR.
THEODORE LERNER
BY
Bean & Bean
ATTORNEYS

INVENTOR.
THEODORE LERNER

BY

Bean & Bean
ATTORNEYS

INVENTOR.
THEODORE LERNER
BY
Bean & Bean
ATTORNEYS

INVENTOR.
THEODORE LERNER

BY

Bean & Bean
ATTORNEYS

INVENTOR.
THEODORE LERNER
BY
Bean & Bean
ATTORNEYS

INVENTOR.
THEODORE LERNER

BY

Bean & Bean
ATTORNEYS

INVENTOR.
THEODORE LERNER
BY
Bean & Bean
ATTORNEYS

INVENTOR.
THEODORE LERNER
BY
Bean & Bean
ATTORNEYS

INVENTOR.
THEODORE LERNER
BY
Bean & Bean
ATTORNEYS

INVENTOR.
THEODORE LERNER
BY
Bean & Bean
ATTORNEYS

INVENTOR.
THEODORE LERNER
BY
Bean & Bean
ATTORNEYS

INVENTOR.
THEODORE LERNER
BY
Bean & Bean
ATTORNEYS

INVENTOR.
THEODORE LERNE
BY
Bean & Bean
ATTORNEYS

INVENTOR.
THEODORE LERNER
BY
Bean & Bean
ATTORNEYS

MULTIPLEXING SYSTEM

BACKGROUND OF THE INVENTION

Standard PCM or binary communication systems are used to transmit multiplexed voice signals over a common link or line. The number of voice channels which may be accommodated is a function of the fidelity required and the number of bits per second which the system is capable of handling. For example, a conventional PCM system capable of handling information in excess of 1,440,000 bits per second can accommodate 36 voice channels quantized to 32 levels at a sample rate of 8,000 per second for each channel. That is to say, the signal on each channel is sampled 8,000 times per second and each sample is represented by a five digit binary number (32 levels). The samples are taken successively on the 36 channels to yield a sequence of 36 five digit binary numbers in a sampling period of 1/8,000 second, yielding a stream of binary digits at a rate of $36 \times 5 \times 8{,}000 = 1{,}440{,}000$ bits per second. In standard systems, additional bits are provided for various synchronization purposes, but since these techniques are in themselves well known, they will be ignored herein for the sake of clarity.

To illustrate the capabilities and limitations of such a system, the number of voice channels may be increased, without exceeding the information rate of which the system is capable, by decreasing the fidelity of the communication. Thus, 48 voice channels may be accommodated by reducing the sampling rate to 6,000 per second, or, by reducing the quantizing level to 16 as represented by four digit binary numbers at the above sampling rate of 8,000 per second, 45 channels may be accommodated, assuming the PCM rate of 1,440,000 bits per second in each case.

In general, then, standard PCM systems are limited in the number of voice channels which may be accommodated by the fidelity consideration. It would be desirable, however, to provide some means for increasing either the number of voice channels which could be accommodated, or the fidelity of communication, or both.

BRIEF SUMMARY OF THE INVENTION

In certain instances, the statistical distribution of total information content contained in a large number of signals may be low within each of successive time periods even though the information content of some of these individual signals is high during such periods. Stated simply in terms of a large number of separate and independent voice communication channels, for example, the probability that the users of all channels will be speaking simultaneously at any time is very slight. This general relationship may prevail, or may be made to prevail, in other and different instances, particularly where the multiplexed signals are uncorrelated as in the specific example given, i.e., for voice channels. The present invention is directed to an improved PCM communication system in which successive frame of digital "sample words," each frame corresponding to one of successive time intervals and the sample words corresponding to the sample amplitudes of the multiplexed signals, are each represented at a series of not more than a specified number of digital "location words" in which the total number of bits involved in each series of location words is very much less than the total number of bits involved in the frame of digital sample words which it represents.

Each frame of the digital bit stream which is obtained from the plurality of multiplexed voice signals is composed of a sequence of binary sample words, each representing the amplitude level of a successive sample of the voice signals. These binary sample words are characterized in that the number of "ones" in each word is related to the probability of occurrence within the frame of the voice sample level to which the sample word corresponds, such that the total number of "ones" in each frame will be substantially less than the total number of "zeros." The location numbers are then obtained from the locations of these "ones" in the frame and are used at the receiving end to reconstruct the frames with high probability. Obviously, the relationship of "ones" and "zeros" could be reversed.

Further, the technique according to this invention involves the derivation of the location numbers by considering first the locations of those "ones" which convey the most significant information content, then the locations of those "ones" which convey the next most significant information content, and so on. In this way, if any given frame of sample words contains more information than can be accommodated within the specified number of location words, the information lost is minimized. The technique involved may be explained best by specific example. Thus, if all sample words are three-bit binary words in which the following order of sample words represent descending voice sample amplitudes:

111

110

101

100

011

010

001

000;

and a frame of sample words were as follows:

word *a* 001 word *b* 001 word *c* 010 word *d* 011 word *e* 100 word *f* 101 word *g* 111 word *h* 111;

and the specified number of location words could represent only the locations of eight "ones" in the frame, derivation of the location number word-by-word would allow a frame reconstruction as follows:

word *a* 001 word *b* 001 word *c* 010 word *d* 011 word *e* 100 word *f* 101 word *g* 000 (lost)

word *h* 000 (lost).

It will be seen that words *g* and *h*, which are words representing the highest voice amplitude are totally lost. According to this invention, however, the location numbers are not derived from word-by-word consideration of the sample words, but by considering the most significant bit (the first bit in this case) of all sample words first, then the next most significant bit (the second bit in this case), and then the least significant bit. Following this technique, the reconstructed frame would be:

word *a* 000 lost word *b* 000 lost word *c* 010 lost word *d* 010 lost word *e* 100 lost word *f* 100 lost word *g* 110 lost word *h* 110 lost.

Although no reconstructed sample word is wholly accurate, no complete word is lost and, in each case, only that bit of least significance is lost.

This high probability of reconstruction is obtained by treating the original bit stream as a series of frames, each of the same number of bits, with this number of bits being large enough so that the statistical distribution of the similar digits is likely to hold. Within this context, the present invention also employs an encoding technique such that the similar digits representative of the greatest information content occur near the beginning of the rearranged frame, the locations of those similar digits representative of the next greatest information content occur next, and so on, with the locations of those similar digits of least information content occurring last in the rearranged frame format. In this way, if any frame contains a number of the similar digits which requires location number transmission time greater than that which can be accommodated, only the information of least significance is lost. The time for transmission of each series of location numbers representing a rearranged frame is thus chosen to be somewhat greater than is required to transmit those location numbers representative of the probable numbers of such digits in the rearranged frame, but in any event, is significantly less than the time which would be required to transmit the entire frame bit by bit.

A further refinement according to this invention involves the derivation of two bits of each location number simultaneously. In what follows in the detailed description of the invention, the location number bit which is derived simultaneously with the location of a "one" is called the "sign bit," but for purposes of explanation with respect to the example given above it shall be considered at the last bit of each sample word.

BRIEF DESCRIPTION OF THE DRAWINGS

FIG. 2 is a table showing the statistical distribution of voice signal levels in a two-way conversation;

FIG. 3 is a table corresponding to the table of FIG. 2, but illustrating the binary coding of the signal levels of FIG. 2;

FIG. 4*a* is a table illustrating a sequence of binary words in the coding format of FIG. 3;

FIG. 4*b* is a sequence of location numbers derived from the table of FIG. 4*a;*

FIG. 4*c* is a sequence of binary location words representing the location numbers of FIG. 4*b;*

FIG. 7 is a table representing the statistical distribution of voice signal levels with respect to FIG. 6 during a two-way conversation;

FIG. 8*a* is a table showing a typical sequence of binary voice samples according to FIGS. 6 and 7;

FIG. 8*b* is a sequence of location numbers derived from the table of FIG. 8*20 ;*

FIG. 8*c* is a sequence of binary location numbers corresponding to the table of FIG. 8*a;*

DETAILED DESCRIPTION OF THE INVENTION

Figure 1:
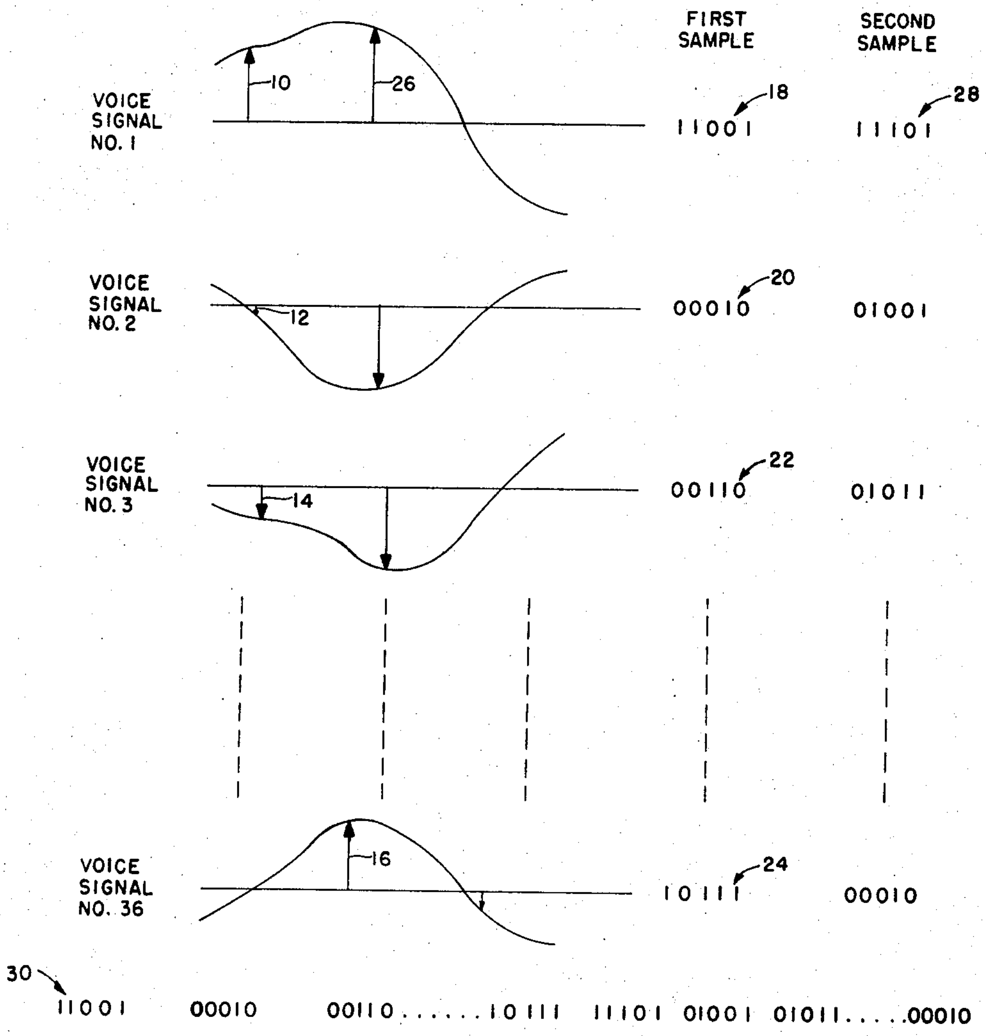
FIG. 1 is a diagram illustrating the analog samples taken for a plurality of voice channels and illustrating the sequence of the samples and corresponding digital words representing the sample levels.

To appreciate the concepts according to the present invention, reference is had now more particularly to FIG. 1, wherein a multiplexed PCM system for 36 voice channels is illustrated. The sequential samplings are of the amplitudes indicated by reference characters 10, 12 and 14 for the first three voice channels or signals, and according to the reference character 16 for the ∓th voice signal. The digital numbers corresponding to these respective samples are indicated by reference characters 18, 20, 22 and 24 respectively. The next sample taken after the sample 16 of the 36th voice channel is the sample 26 of the first voice signal, as illustrated, and its corresponding binary number is the sample number 28, and so on, to present the continuous bit stream which is the five digit binary numbers in sequence as indicated by the reference character 30 at the bottom of FIG. 1.

In FIG. 2, one form of binary word representation is illustrated for the 31 various levels which encompass the totality of amplitude variation between maximum and minimum levels which are selected for reproduction. FIG. 2 also illustrates the frequency of occurrence for each of the specified levels as measured in the laboratory. Level number 16 which corresponds to zero amplitude will be seen to occur much more frequently than any of the other levels, and, in fact, it occurs more than three quarters of the time. Furthermore, the small quantum levels on either side of this zero level occur much more frequently than do the large quantum levels and it is this fact which allows for the encoding technique according to the present invention, as will be appreciated from a study of FIG. 3. It will e noted that FIG. 3 differs from FIG. 2 only be the representation of the binary word corresponding to each of the signal levels indicated. It will be noted also that the proposed binary representation according to FIG. 3 provides for representation of zero amplitude level 16 by a 5-bit binary word which contains all "-zeros," and that the small quantum level signals, in their binary representation, contain only a single "one;" that the next most probable quantum levels are represented by binary words containing two "ones;" and so on, so that the number of "ones" in the 5-digit binary representation is related to the magnitude of the sample value. It can be computed from FIG. 3 that, if the proposed binary representation is used in a system where many signals are multiplexed on a common line, the resulting binary sequence will have "ones" occurring with a probability of approximately 0.057, that is, most of the binary symbols will be "zeros" and the "ones" will occur at an average rate of about 1 in 17.

To appreciate the significance of the encoding technique illustrated in FIGS. 2 and 3, reference is had to FIG. 4A, wherein a sequence of binary words in the modified representation is shown. As has been previously discussed, the number of "ones" occuring in the modified binary representation is very small as compared with the total number of digits. Now, if the sequence or frame shown in FIG. 4A is transmitted by counting the locations in the frame in which the "ones" occur, the entire frame may be reproduced from these location numbers.

These location numbers each may be represented by a five digit word in which the number of "zeros" which occur in the frame sequence of FIG. 4A until a "one" is encountered, plus one, is the location number, the next location number being established by resuming the count from one, so long as the number of "zeros" does not exceed thirty. If 30 "zeros" are counted before a "one" occurs, the location number is noted as 31, and counting is resumed as before. If this procedure is followed with respect to the sequence in the frame shown in FIG. 4*a*, the sequence of location numbers tabulated in FIG. 4*b* will result, and the corresponding sequence of binary words representing these location numbers is represented in FIG. 4*c*. It will be obvious from a study of FIGS. 4*a* and 4*c* that the total number of bits in the sequence of binary words representing the location numbers derived from the original sequence of binary words in the modified encoding of FIG. 4*a* is very much less than the total number of bits in the frame sequence of FIG. 4*a*. It is these general relationships which allow a PCM system of a given transmission-rate capability to handle a great many more voice channels than otherwise could be accommodated.

A VARIABLE SAMPLING RATE SYSTEM

Figure 5:
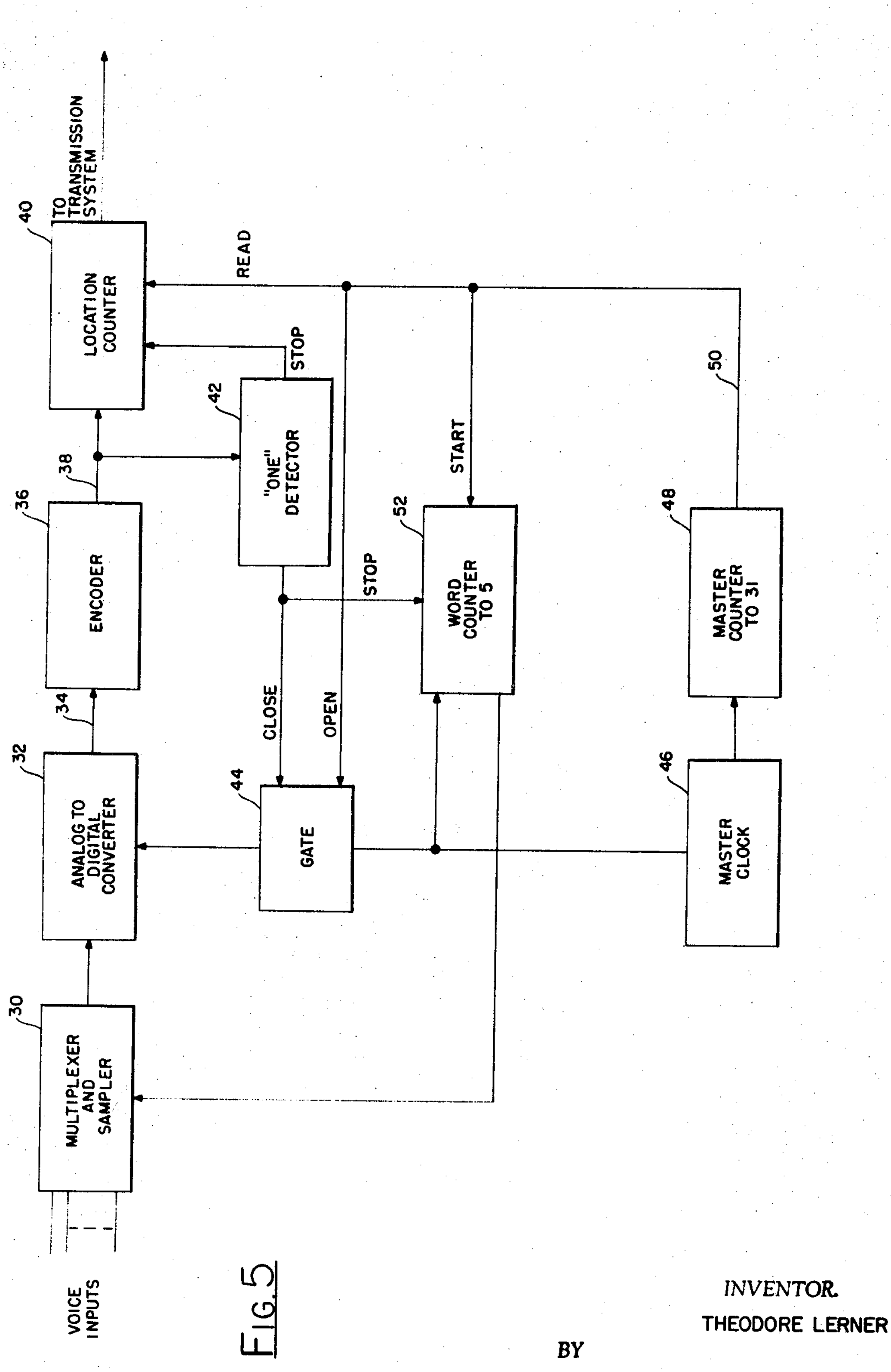
FIG. 5 is a block diagram illustrating certain principles of a system according to the invention.

FIG. 5 shows, in a block diagram form, a system for utilizing the principles expressed hereinabove. In the system according to FIG. 5, the voice inputs are directly available and the sampling and multiplexing are under the direct control of the system illustrated. The input voice signals are sampled and multiplexed by the circuitry 30 and converted to five digit binary numbers by the analog-to-digital converter 32 in entirely conventional fashion, except, in the system shown, the sampling rate is varied as will hereinafter be described. The binary words in the form illustrated in FIG. 2 are applied over the channel 34 to the encoder device 36 which produces at its output channel 38 the modified binary representation depicted in FIG. 3. This output is applied to the location counter 40 and a "one" detector 42. The location counter 40 is stepped for each incoming digit and upon the occurrence of a "one," the "one" detector 42 stops the location counter and closes the gate 44 which is permitting the master clock 46 to step the analog-to-digital converter 32. Since the count in the location counter 40 includes the "one," it is the number of consecutive "zeros" plus one. That is, it is the location number discussed above. The master counter 48, however, continues to count out to 31 at which time a "read" signal is generated at the channel 50 which is applied to the location counter 40 and to the gate 44, causing the location counter to read out the location number and permit the gate 44 to pass the master clock signal to commence stepping the analog-to-digital converter again. This cycle is repeated until all of the 36 channels are sampled and quantized at which time a frame synchronization signal is inserted into the transmission to control the decoder (not shown) for the start of counting the "zeros" for the decoding process. Should there be 30 consecutive "-zeros" in the digit stream from the encoder 36, the location number 31 is transmitted and the count resumed at one with the next digit from the encoder. Since there are five binary digits in each sample, the word counter 52 steps the multiplexer and sampler 30 after every fifth digit.

Certain basic concepts of the present invention should be apparent from the foregoing description of FIGS. 1–5 inclusive. Based upon the statistical probability of the distribution of various levels of voice signal sample amplitudes, the original digital representation of the amplitudes of the samples of a plurality of multiplexed voice channels is converted or encoded into a form in which one digit, either a "zero" or a "one" is caused to be present in the modified binary word the least number of times for the most frequently occurring amplitudes, and for amplitude levels of decreasing probability of occurrence, this same digit is caused to occur in increasing frequency. Thus, in the encoded digital wording, the digit selected for least occurrence is that which occurs infrequently in the most commonly occurring signals. It is therefore possible to transmit digital words representing the locations of the selected digit which, when the process is reversed, exactly or nearly exactly reproduces the original encoded frame sequence and from which the original binary representation and ultimately the original voice signal may be reconstructed.

A FIXED SAMPLING RATE SYSTEM

Figure 6:
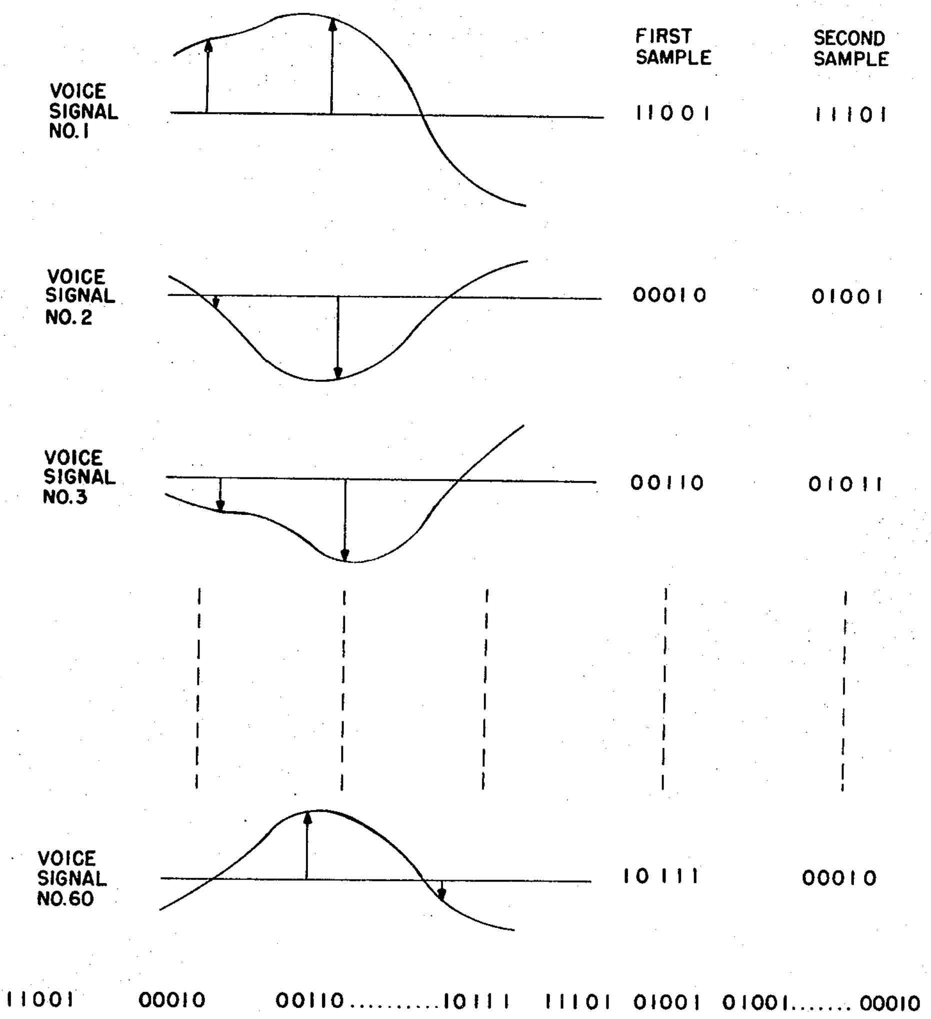
FIG. 6 is a diagram similar to FIG. 1 showing different number of voice channels.

With reference now more particularly to FIG. 6, it will be seen therein that same is similar to FIG. 1, except that there are 60 voice channels represented which are sampled and quantized as described hereinbefore to produce a bit stream of binary words as indicated at the bottom of the Figure. The representation shown in FIG. 7 constitutes a standard binary representation of 32 levels of sample amplitude, and also the frequency of occurrence of the sample amplitudes on a statistical distribution basis is illustrated in FIG. 7.

In the binary representation shown, the first four symbols represent sample magnitude and the last symbol represents sign. As shown, the first of these four symbols is the most significant bit, the second is the next most significant bit, etc.

As will hereinafter be described, a typical sequence of binary words representing binary voice samples of the 60 channels is depicted in FIG. 8*a*, which binary words are stored in a buffer and are read out in modified form such that the digits of the sequence indicated by the three columns of words in FIG. 8*a* are read out first down the respective left-hand digit columns as indicated by the reference characters 60, 62 and 64, in that sequence and starting from the top of the column 60 to determine the positions of the "ones" and establish the location numbers thereof. Additionally, in this particular system, the right-hand digit in each word, which is indicative of the sign of the sample amplitude, is utilized as the sixth bit added to the 5-bit word representing the location number. Thus, from FIG. 8*a*, counting down beginning at the top of column 60, and continuing down from the top of the column 62 until the "one" at 66 is encountered establishes the location number 29 for such "one." Simultaneously, the "zero" indicated by the reference character 68 representative of the sign is recorded, and so on, for establishing the sequence of location numbers and sign bits as indicated in FIG. 8*b*. When thirty "zeros" have been encountered before reaching a "one," the number 31 and the corresponding sign bit is written. Thus, the 30th "zero" encountered after the "one" 66 is the "zero" 70 in FIG. 8*a* and the number 31 and the sign bit of "one" is written as the second location number as shown in FIG. 8*b*. The count starts over at the "zero" 72 to the next "one," and so on, until the locations of the "ones" in the first four columns of each of the words have been established. The sequence of binary numbers which represents the location numbers of FIG. 8*b* plus the sign bits as the sixth digit of each word are represented in FIG. 8*c*.

It is clear that, except for the sign bit associated with the "zero" level, the original binary sequence of FIG. 8*a* can be exactly reproduced from the location numbers FIG. 8*b* and in fact there is some redundancy with respect to the sign bit. Each of the numbers of FIG. 8*b* is less than 32, and, therefore, each of these numbers can be represented by a five digit binary word, the sixth bit being the sign bit as set forth above. It can be seen that the original sequence of 65-bit words given in FIG. 8*a* can be exactly represented by the sequence of 16 6-bit words given in FIG. 8*c*. Thus, for this particular example, 96 bits are required to represent the original 300 bits.

In a fixed-sampling rate system the sequence of 60 5-bit sample words as shown in FIG. 8a may be generated say every 1/8,000 of a second. Since, however, the number of "ones" which occur in any sequence is variable, the number of location numbers corresponding to the 60 5-bit sample words would be variable also. The digits illustrated in FIG. 8c and a frame synchronization word at the end of each frame must, however, be transmitted at a fixed rate over the communication system and, therefore, buffers are required, which will be described hereinafter. If the communication system is to transmit 120 bits in the 1/8,000 of a second in which the 60 voice channels are sampled, the communication system can then transmit 20 6-bit location numbers corresponding to the 60 5-bit voice samples. If, as illustrated in the example given, fewer than twenty location numbers are required to represent the sixty voice samples, the remaining slots may be filled with location numbers representing "zeros," i.e., with the numbers 31(0). If, however, more than twenty location numbers are required for some particular sequence of 60 voice samples, then there will be a buffer overflow, and some information will be lost. Since the location numbers corresponding to the least significant bits occur last, only information concerning the least significant bits will be lost when buffer overflow occurs. The effect of buffer overflow then is simply to reduce the fineness of quantization from five bits to four bits in this particular example.

Figure 9:
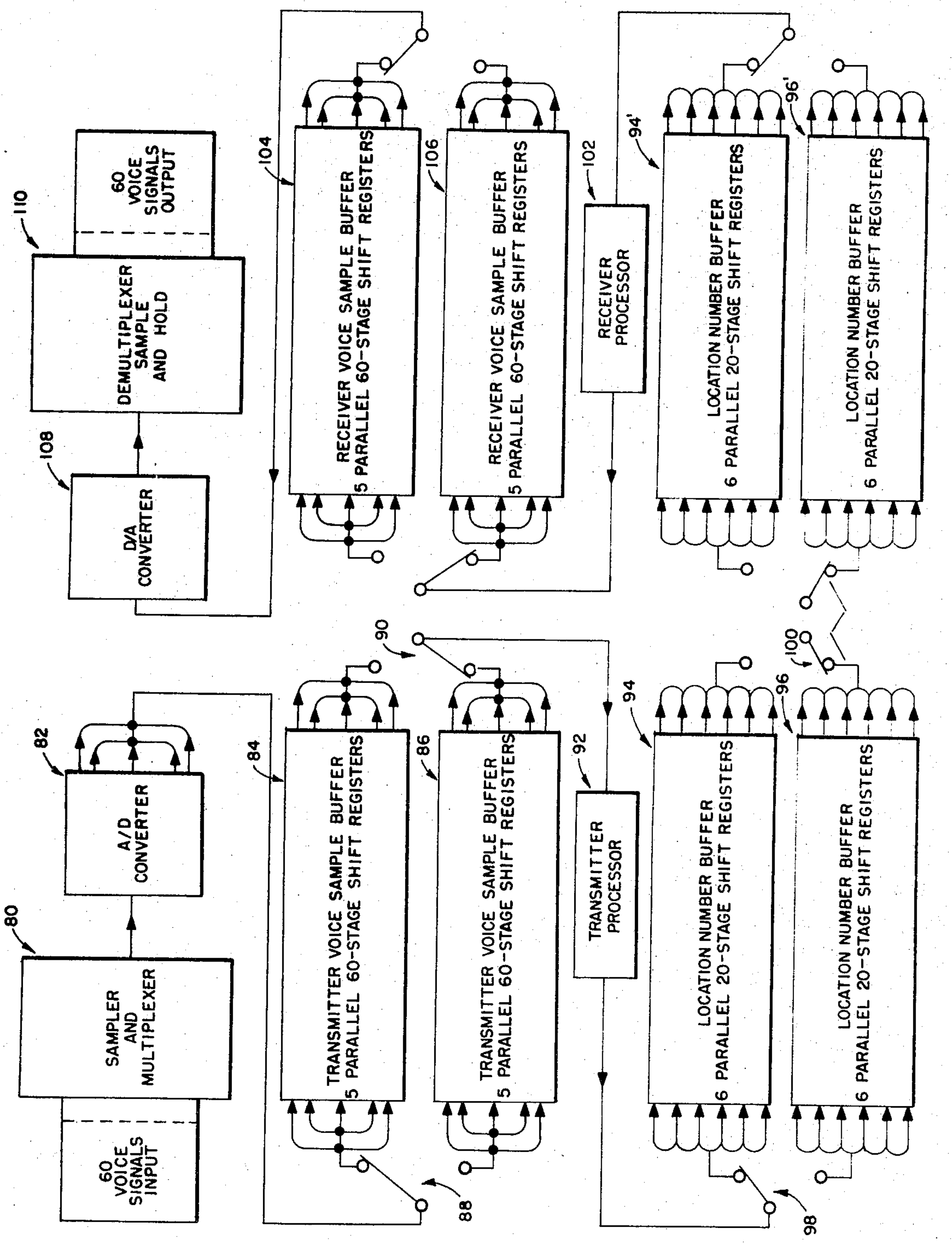
FIG. 9 is a system block diagram functionally illustrating an entire system according to a preferred embodiment of the invention.

Referring now to FIG. 9, a schematic diagram is shown which will illustrate the basic principles required to construct a system according to FIGS. 6–8. In FIG. 9, the incoming voice signals are sampled and multiplexed in the circuitry 80 in an entirely conventional fashion and the analog-to-digital conversion is effected in the circuitry 82, also in an entirely conventional fashion. Two buffers 84 and 86 are provided which are operated in alternate fashion such that, when one buffer is storing, the other buffer is being shifted out, switch means 88 and 90 being provided for this purpose. The buffers 84 and 86 each consist of five parallel 60-stage shift registers in which the first 5-digit sample word of the bit stream coming from the analog-to-digital converter 82 is stored sequentially in the first stages of the five parallel shift registers, the next 5-digit sample word is stored in the second stages of the five shift registers, and so on. Then, when the shift registers are shifted out serially, the original bit sequence is altered so that the location numbers can be determined simply by counting in the fashion described in conjunction with FIG. 8 hereinabove.

The location numbers are determined in the transmitter processor indicated generally by the reference character 92 and these 6-bit location numbers are stored in the six parallel 20-stage shift registers 94 and 96 alternately as established by the switch means 98 and shifted out alternately as indicated by the switch mechanism 100. The data link may be of any desired form such as a radio link, and serves to transfer the location numbers to the receiver location number buffers 94' and 96'.

At the receiver, the location numbers are processed at the circuitry 102 to yield the sequence of sixty five-bit voice samples in the receiver voice sample buffer 104 or 106. The receiver voice sample buffers are read alternately into the digital-to-analog converter 108 and, during each frame or sequence, there appears at the output of the digital-to-analog converter 108 a sequence of 60 pulses the amplitudes of which are governed by the 60 5-bit binary numbers read into the digital-to-analog converter. The 60 amplitude-modulated pulses are then fed to the demultiplexer and to the sample-and-hold circuit 110 at the output of which there appear the 60 duplicated voice signals.

Figure 10:
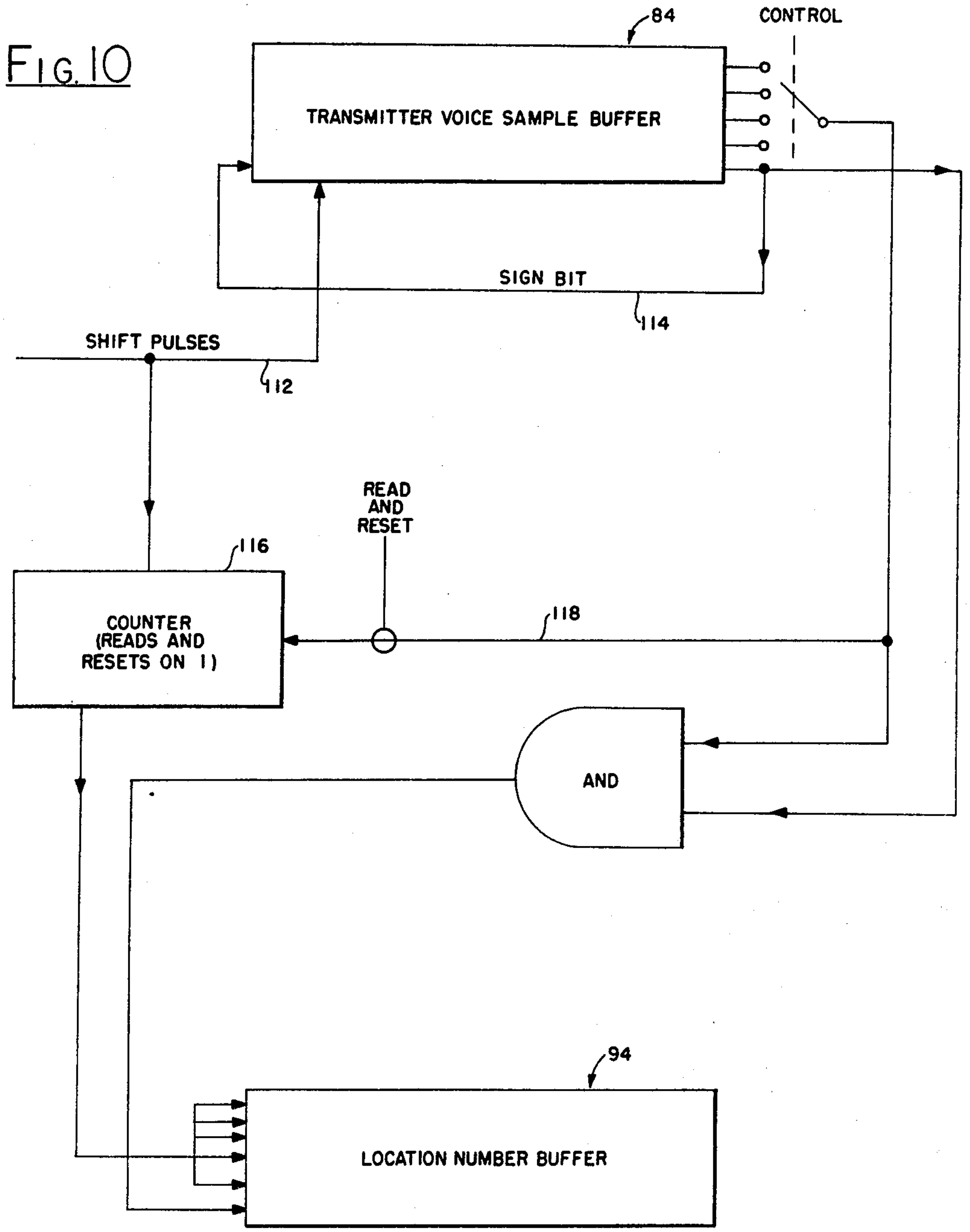
FIG. 10 is a block diagram illustrating the system of the transmitter processing.

The transmitter processing circuitry 92 is illustrated in FIG. 10 in associated with one of the transmitter voice sample buffers 84. In this Figure, it should be assumed that the transmitter voice sample buffer 84 has just been loaded with a complete frame of binary voice samples and that the contents of the buffer are now being read out by a sequence of shift pulses at 112 whose pulse rate is much faster than the pulses which were used to read in the information. This is necessary since the contents of the buffer will be read bit by bit while the information was read into the buffer in 5-bit sample groups. In reading out the buffer, first the contents of the register containing the sequence of the 60 most significant bits will be read out (the sequence of columns 60, 62 and 64 of FIG. 8a); then the register for the second most significant bits will be read out; then the register for the third most significant bits will be read out; and finally the contents of the register containing the least significant bits will be read out. The contents of the sign-bit register is read out together with each of the other registers, but the sign bits are fed back into the register so that the sign bits are never lost as indicated by the channel 114. Thus, the rate of the shift pulses at 112 must be at least four times as fast as the rate at which the sample words were read in. The location number counter 116 is part of the transmitter processing circuitry 92 and, as indicated, reads and resets upon the occurrence of a "one." When a "one" occurs at the output of the transmitter voice sample buffer, at the line 118, the contents of the counter are read out into the location-number buffer 94 or 96 as described previously and the counter is reset to "zero." The counter thus counts the number of shift pulses between successive "ones" in the register and therefore the content of the counter is, if fact, the location number. At the same time that the counter content is read into the location-number buffer 94 or 96, the sign bit is read into the sixth register of the location-number buffer 94 or 96 by ANDing it with the "one" that caused the counter 116 to be read. If the counter 116 should read the number 30 before a "one" has occurred, the counter is incremented by "one" and the resultant number, 31, is read into the location-number buffer 94 or 96 and the counter is reset to "zero."

If after reading out the complete contents of the transmitter voice sample buffer fewer than nineteen location numbers have been generated, the location number register is stepped to the right until the slot at the far right is filled with the first location number and the empty slots at the left are filled with the numbers 31(0). The contents of the location-number buffer is now ready for transmission.

Figure 11:
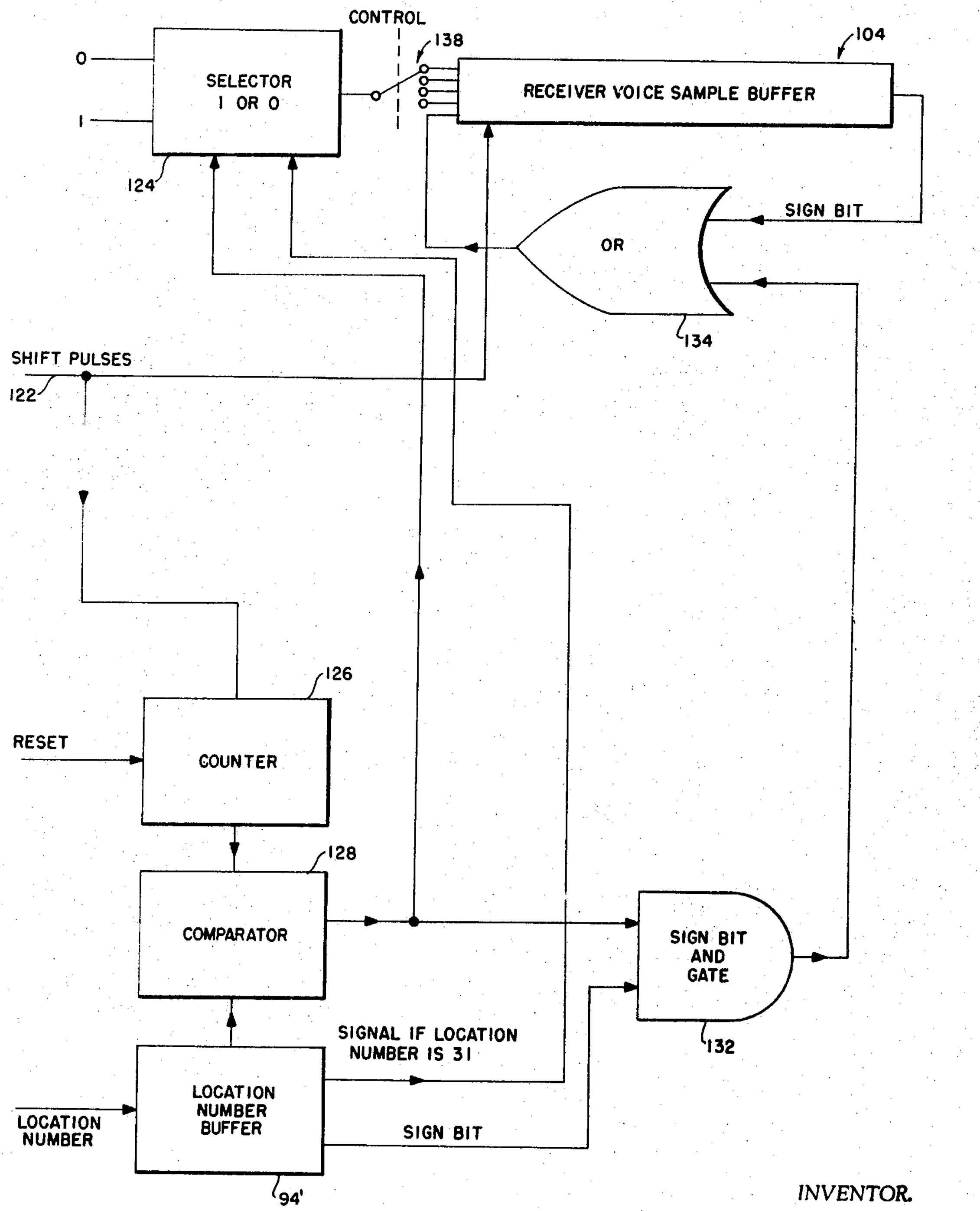
FIG. 11 is a block diagram illustrating the principles of the receiver processing.

The processing at the receiver is illustrated in FIG. 11. Assuming that the receiver voice sample buffer 104 or 106 of FIG. 9 is empty, the location-number buffer 94' or 96' has just been filled. Shift pulses at a high rate are fed at 122 to the most significant register and the sign-bit register of the receiver voice sample buffer. The "one" or "zero" selector 124 is set to "zero" so that "zeros" are entered into the most significant bit register of the buffer 104 and the shift pulses at 122 are counted in the counter 126 so that when the count is equal to the location number stored in the location-number buffer 94', the comparator 128 generates a signal, which is fed to the selector 124, where it sets the selector to "one." This signal is also fed to the sign-bit AND gate 132, where it passes the sign bit to the register of the buffer 104 through the OR gate 134. The counter is reset to "zero" and the process is repeated. Thus, "ones" and the associated sign bits are inserted at the proper location in the receiver voice sample buffer 104 or 106. When a 31(0) is received as a location number, the "one" or "zero" selector is held in the "zero" position.

After a total count of 60 has been attained, the control switch 138 switches to the next most significant bit register of the receiver voice sample buffer and the process continues until all registers are full. As shown, the sign bits are circulated around in the sign bit register. The new sign bits are fed into an OR gate 134 with sign bits that have already been inserted so that the old sign bits are preserved and the new sign bits are inserted as they occur with new location numbers. If an overflow has occurred at the transmitter, the receiver voice sample buffer will not be filled when the last location number of a frame has been processed, and the unfilled register is stepped to the right and "zeros" are inserted until all the register stages are filled.

A DETAILED FIXED SAMPLING RATE SYSTEM
multiplexing

Figure 12:
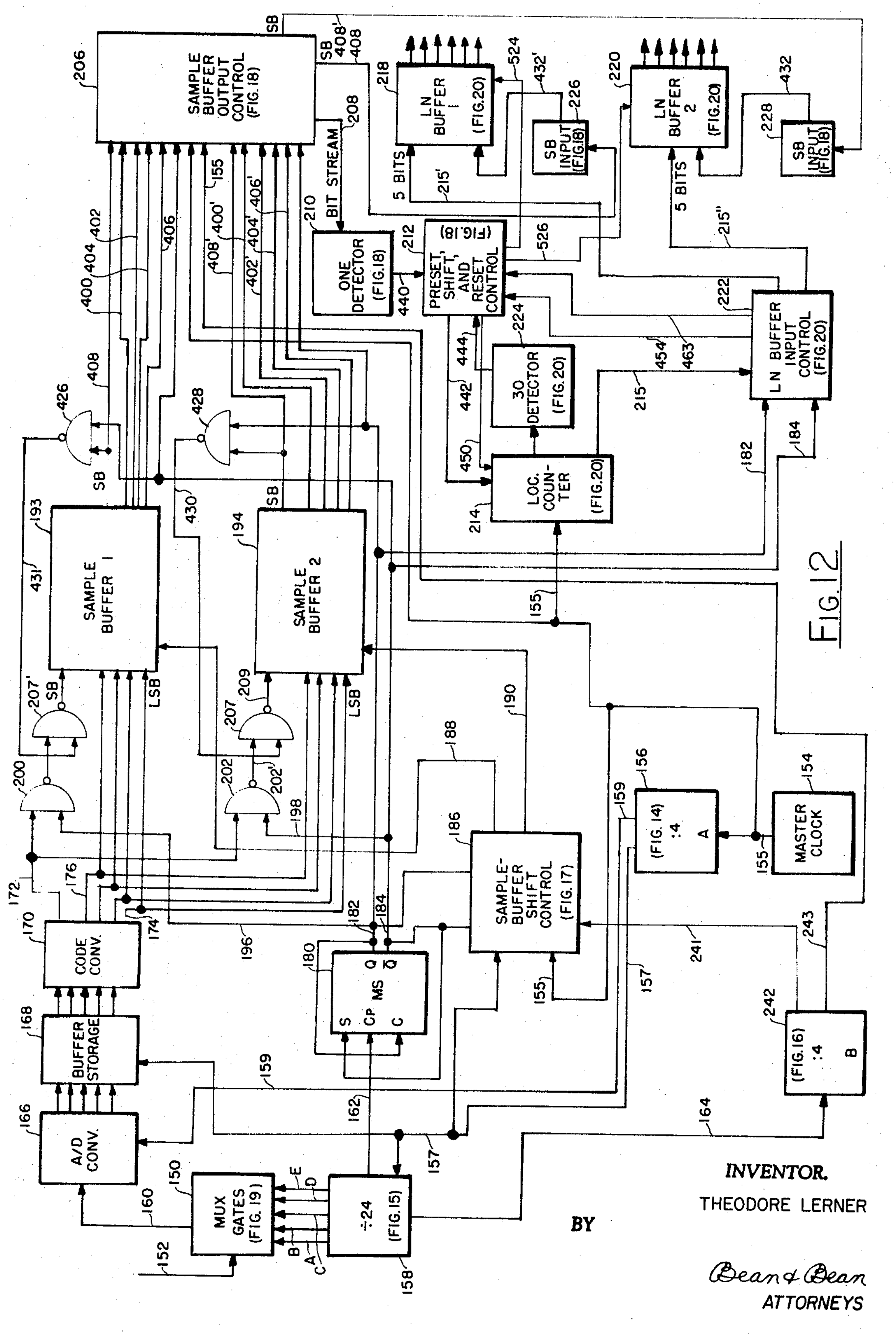
FIG. 12 is a block diagram of the transmitter portion of the preferred embodiment of the invention.
Figure 13:
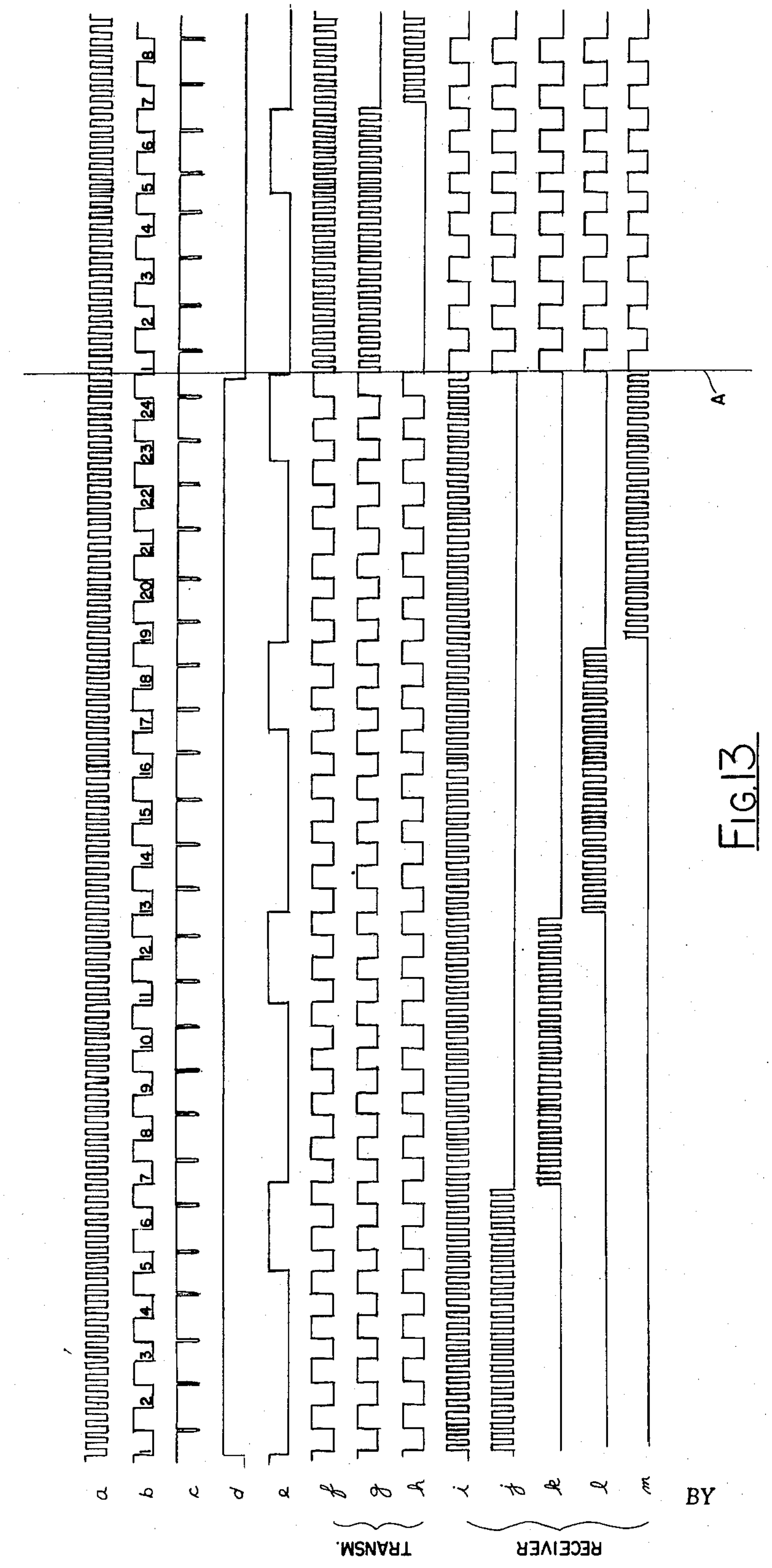
FIG. 13 is a timing diagram illustrating certain principles in connection with FIG. 12.
Figure 19:
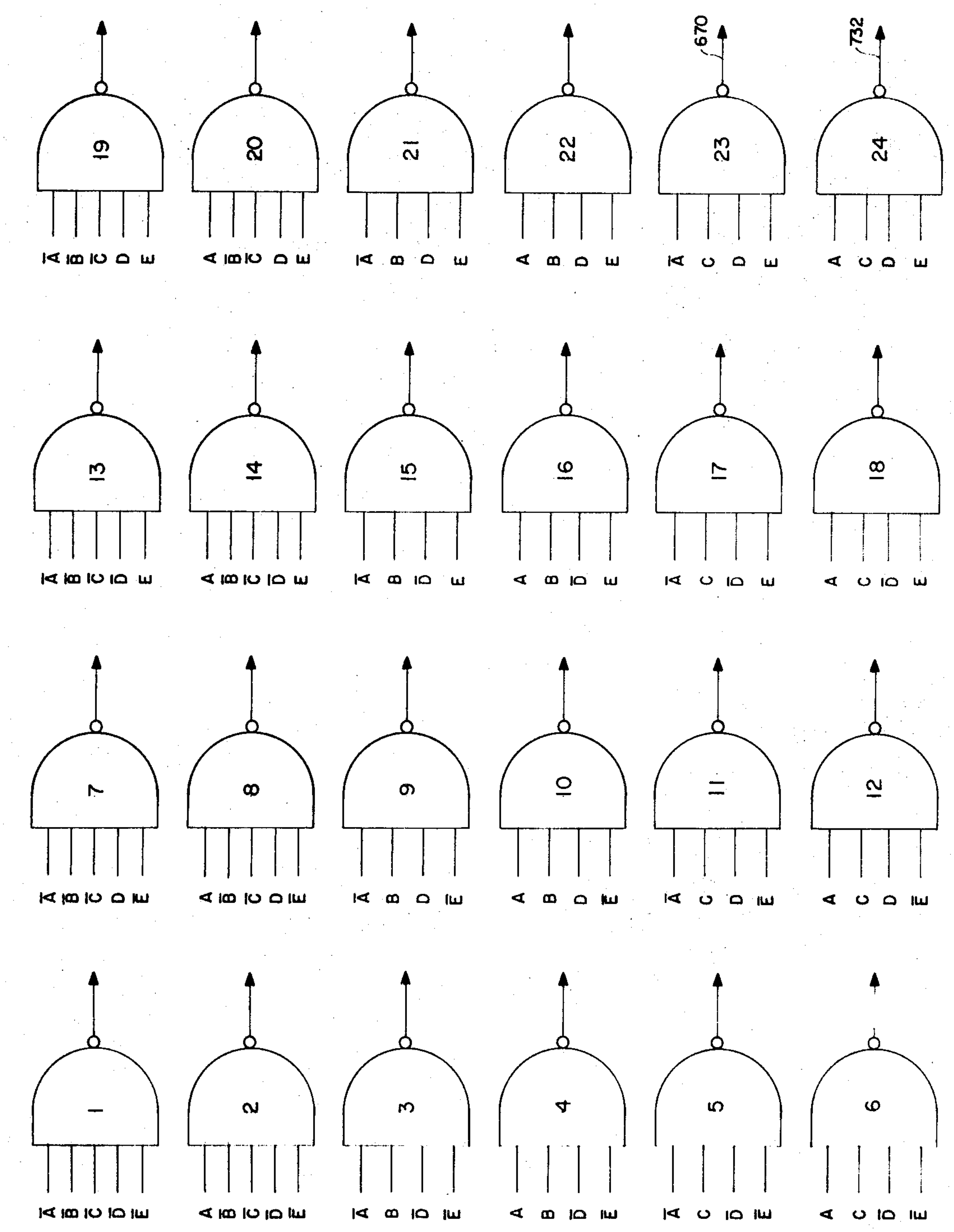
FIG. 19 is a diagrammatic view illustrating the multiplexing gates.

The remaining figures in the drawings illustrate an embodiment constructed according to the principles of the present invention as discussed more generally above. Referring to FIG. 12, wherein the major part of the transmitter portion of the system is shown in simplified form, the plural voice channel input to the multiplexing gate system 150 is represented by the single input 152 for the sake of clarity. In the particular system shown, there are 24 voice channels applied as inputs to the multiplexing gate system 150 and each voice channel is controlled by a separate gate so that there are 24 multiplexing gates in all, as illustrated in FIG. 19. The entire transmitter system is under the control of the master clock 154, whose output 155 is applied to the divide-by-4 counter 156 which provides two outputs at the conductors 157 and 159, the former of which is at a rate one-quarter of the master clock rate and the latter of which is at this same rate but of different waveform to provide the sampling pulse for the analog-to-digital converter 166. The waveforms of these two outputs are shown respectively in FIGS. **13*b* and 13*c*, whereas the master clock output is shown in FIG. 13*a*. The clock output of the counter 156 is applied both to the divide-by-24 counter 158 and the sample buffer shift control circuit 186, the counter 158 having an output at the conductor 162 which is at a rate one-ninety-sixth that of the master clock rate and another clock output at the conductor 164 which is at a rate on-twenty-fourth that of the master clock rate. The circuit 158 also has the five outputs A, B, C, D and E which control, as reference to FIG. 19 will show, the respective multiplexing gates so that these gates successively produce outputs to effect the successive voice channel outputs to the analog-to-digital converter 166**.

To complete the clock system for the transmitter, the divide-by-4 counter 242 and the binary master switch 180 are provided. The counter 242 has its input from the conductor 164 and provides the output at conductor 243 which is at a rate one-twenty-fourth that of the master clock. The master switch 180 produces static outputs alternately at its Q and $\bar{Q}$ terminals to which the conductors 182 and 184 are connected so that each signal is up for a total of 96 master clock pulses, as shown in FIG. **13*d*, for the master switch Q output at the conductor 182**.

The output 157 of the divide-by-4 circuit 156 is applied to the buffer storage circuitry 168. The sampling pulse at the conductor 159 is, as aforesaid, at one-quarter the rate of the master clock 154 and the analog-to-digital converter 166 is of the type which produces binary word outputs for each sample according to the representation of FIG. 2. Each binary word is shifted to the buffer storage 168 and then to the code converter 170 where the binary word format is converted to that binary representation according to FIG. 7. It will be appreciated that the buffer storage 168 and code converter are necessary in the system illustrated in FIG. 12 only because of the nature of the converter 166 which was used. The converter 166 actually used was of the unipolar type and did not provide the output formal (FIG. 7) desired. It will also be appreciated that a conventional bipolar converter could have been used directly to provide the required output format so that the buffer 168 and code converter 170 could have been eliminated. It will be appreciated further that the plus and minus zero levels are equally distributed on either side of zero voltage and, in FIG. 12, the conductor 172 carries the sign bit corresponding to the last bit of the binary representation of FIGS. 7 and 8, the conductor 174 carries the next to last bit and so on, with the most significant bit corresponding to the first bit of the binary representation of FIG. 7 being carried on the conductor 176.

The output of the conductor 162 from the divide-by-24 circuit 158 is, as aforesaid, at one-ninety-sixth the rate of the master clock 154, and this output is applied as the clock-pulse input to the flip-flop 180 connected as shown, which has a Q output at 182 and a $\bar{Q}$ output at 184, both of which are applied to a sample buffer shift control circuitry 186, which has outputs at 188 and 190 for controlling the two sample buffers 193 and 194. These two outputs of the flip-flop 180 are also applied at conductors 196 and 198 as inputs to the NAND gates 200 and 202 of sign-bit-feedback circuits as will hereinafter be more particularly described.

When one sample buffer is storing, the other sample buffer is being shifted out, it being appreciated that the storage in the sample buffers 193 and 194 is in parallel while the shifting out is in serial fashion so that the rate at which the bits are shifted out of the sample buffers is much more rapid than the rate at which the words are stored. This is effected by the conductor 155 from the master clock 154, which is applied to the sample-buffer output control 206 and to the sample-buffer shift control 186 to control outshifting of the sample buffers.

The bit stream shifted out of the buffer 193 or 194 appears at the conductor 208 and is monitored by the "one" detector 210. Initially, the location counter 214 has been reset to the digital count of zero and it then starts counting the "zeros" in the bit stream at the master-clock rate to apply a 5-bit digital count number directly to either the location number buffer 218 or 220, the buffer to which the number is applied being controlled by the input control 222. The conductors carrying the 5-bit location number from the counter 214 are illustrated symbolically in FIG. 12 by the single conductor 215 and their application to either the buffer 218 or 220 by the respective single conductors 215' and 215''. When a "one" is detected in the bit stream at the conductor 208, the control 212 shifts the number from the counter 214 into the appropriate buffer 218 and 220 and resets the counter 214. When thirty "-zeros" are counted without the occurrence of a "one" in the bit stream, the detector 224 causes the control 212 to preset the counter 214 to the number thirty one whereafter this number is shifted into the appropriate buffer 218 or 220 and the counter 214 is reset as before.

The complete location number shifted into the location number buffer 218 or 220 also includes the sign bit as the sixth bit thereof, and these functions are achieved by the sign bit input controls 226 and 228 which have their inputs from the sample buffer control 206 as hereinafter explained.

Figure 12A:
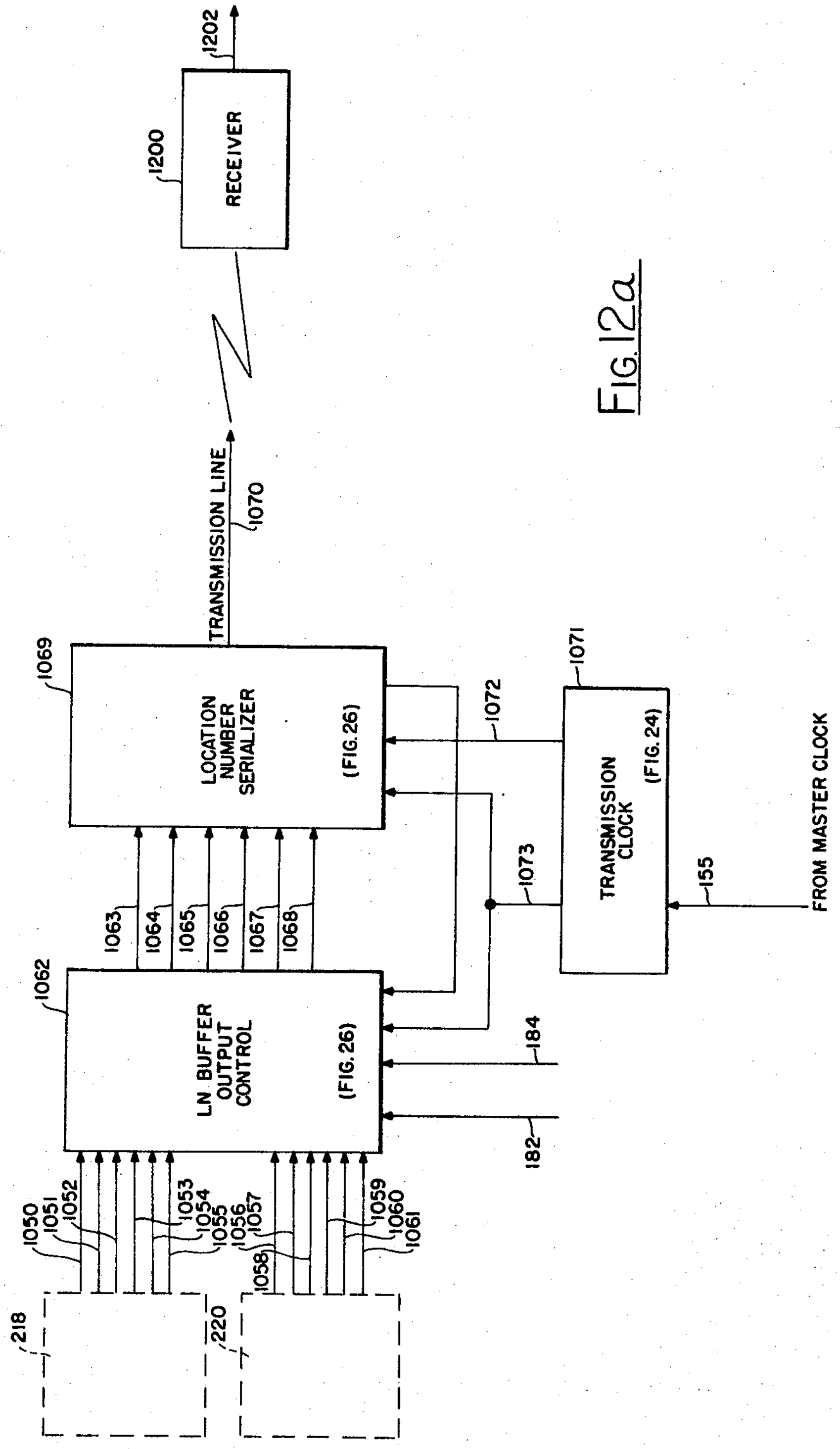
FIG. 12a is a block diagram illustrating a method of transmission according to the preferred embodiment of the invention.

Since the location numbers occur asynchronously, each storing shift of the location number buffers 218 and 220 is effected in consonance with the generation of a location number. For shifting the location numbers out of storage for transmission to the receiver, a separate transmission clock is provided and this portion of the transmitter is illustrated in FIG. 12A. Since, as was discussed hereinabove, it can be shown that "ones" will occur at an average rate of about one in seventeen bits of significance, fewer than five location numbers (i.e. fewer than 96/17) will be required on the average completely to define each frame. In order to lessen the likelihood of location number buffer overflow and to allow for synchronization between the transmitter and receiver, each location number buffer is constructed arbitrarily to accommodate eight location numbers.

As will be described hereafter, the storage cycle for each buffer 218 and 220 includes circuitry for completely filling each buffer in the event that fewer than eight location numbers are generated per frame cycle. This is accomplished by a finish-shift circuit which also causes the last number shifted into the buffer to take the form of a unique synchronization number which, for the present case, is the digital number "zero" which has been reserved for this purpose. The other slots of the buffer being finish-stored are filled with the digital numbers 31.

The remainder of the transmission portion of the system is illustrated in FIG. 12A wherein it will be seen that the six output conductors 1050–1055 from the location number buffer 218 and the six output conductors 1056–1061 from the location number buffer 220 are all applied to the location number buffer output control 1062. The control circuit 1062 determines which of the buffers 218 or 220 is selected for transmission on the basis of the master switch inputs 182 and 184 thereto and whichever location numbers are to be transmitted are applied over the six conductors 1063–1068 to the location number serializer 1069 where the six bits of each location number are transmitted from the output transmission line 1070, over a suitable data link, to the receiver.

The transmission clock 1071 is controlled by the master clock input 155 to apply one signal over the conductor 1072 to the serializer 1069 to shift the six bits of each location number out in series over the line 1070. The transmission clock has also the output at 1073 which causes the next location number to be shifted out of the appropriate buffer 218 or 220 and it also causes this number to be stored in the serializer 1069 for subsequent serial outshifting by the signals over the conductor 1072.

In the system shown in FIG. 12, there are 24 samples taken each cycle or frame, these samples being quantized to 32 levels according to the format of FIG. 7 and then read in parallel into one or the other of the sample buffers 193 or 194. Since four bits of each quantized sample are bits of significance while the fifth or each is the sign bit, as is explained in connection with FIG. 8*a*, and since the sign bit is recycled when the sample buffers are read out, the serial shifting out of the sample buffers 193 or 194 is four times the sampling rate, or, in other words, at the master clock rate.

On the other hand, since there are 96 bits of significance in each frame, there will be a minimum number of three location numbers per frame. To appreciate this, it will be understood that, if all of the bits of significance are "zeros," the minimum of three location numbers ($3 \times 30$) would be required to define the frame and no fewer would ever be sufficient to define a frame. That is to say, since there is a location number 31 stored if thirty consecutive "zeros" are encountered, there will be at least 96/30 location numbers per frame.

The clock circuit 156 is the clock which controls shifting of the samples into storage, whereas the master clock 154 controls outshifting of the sample buffers and operation of the location counter and, as well, provides a finish-shift function when required. The clock circuit 242 is the clock which controls the four consecutive pulse streams per cycle necessary to outshift the stored samples in the serial sequence. Its output is directed, according to the master switch Q and $\overline{Q}$, to one or the other sample buffer. The Q and $\overline{Q}$ of the master switch 180 serially are up each for 96 master clock pulses and they control which sample buffer is storing and which is being outshifted.

Figure 14:
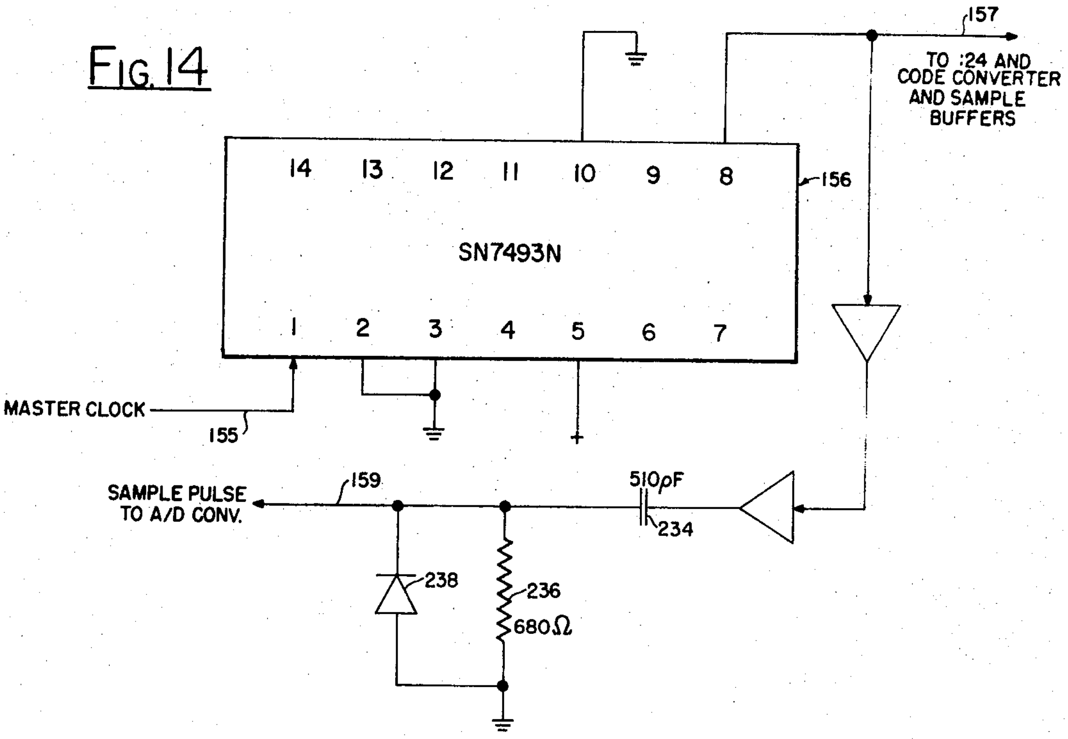
FIG. 14 is a circuit diagram illustrating one of the clocks of the transmitter.

The divide-by-4 circuit 156 is a counter as shown in FIG. 14 and will be seen to include the input from the master clock conductor 155 whose input waveform is as shown in FIG. 13*a* and which divide-by-4 circuit produces the output at the conductor 157 whose waveform is according to the showing of FIG. 13*b*. The pulse output of FIG. 13*b* is suitably inverted and is then differentiated by the capacitor 234 in associated with the resistor 236 and diode 238 to produce the sampling pulse output at 159 according to FIG. 13*c*.

Figure 15:
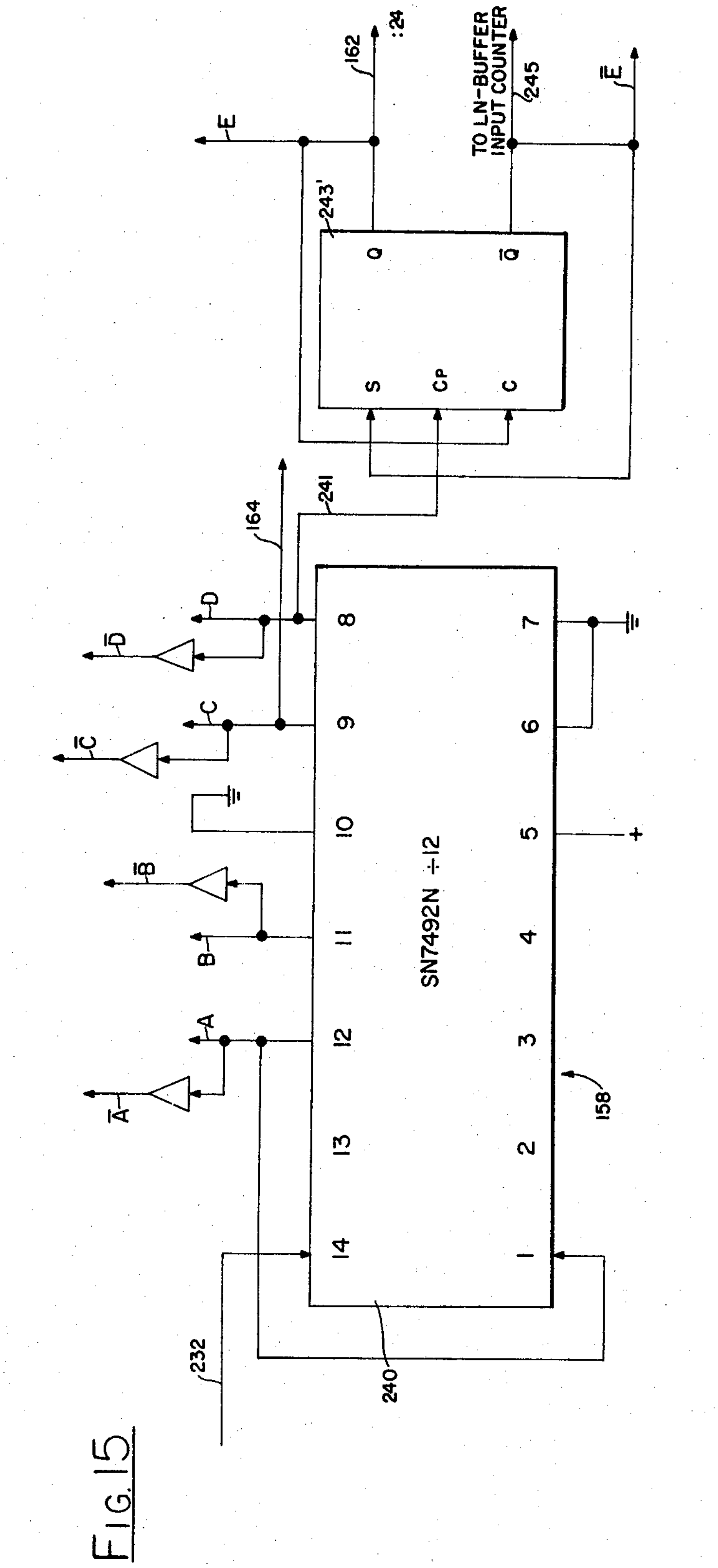
FIG. 15 is a circuit diagram illustrating another of the clocks used in the transmitter and illustrating also a table showing the output signals for controlling the multiplexing gates.

The circuitry 158 is shown in FIG. 15 and will be seen to include the integrated circuit 240 which is a counter having the previously mentioned outputs A, B, C and D and the inverted outputs $\overline{A}$, $\overline{B}$, $\overline{C}$ and $\overline{D}$ as well as the output at the conductor 164 which is at one-twenty-fourth the master clock rate. The output at the conductor 241 is at one-forty-eighth the master clock rate and is applied to the flip-flop 243' as a clock pulse therefor, the Q output of this device being to the conductor 162 applied to the switch 180 (FIG. 12) and the $\overline{Q}$ output being to the conductor 245 to control the location number buffer input counter.

The output at the conductor 164 of FIG. 15 is in accord with the waveform shown in FIG. 13*e* whereas the output at conductor 182 of FIG. 12 is shown in FIG. 13*d*.

Figure 16:
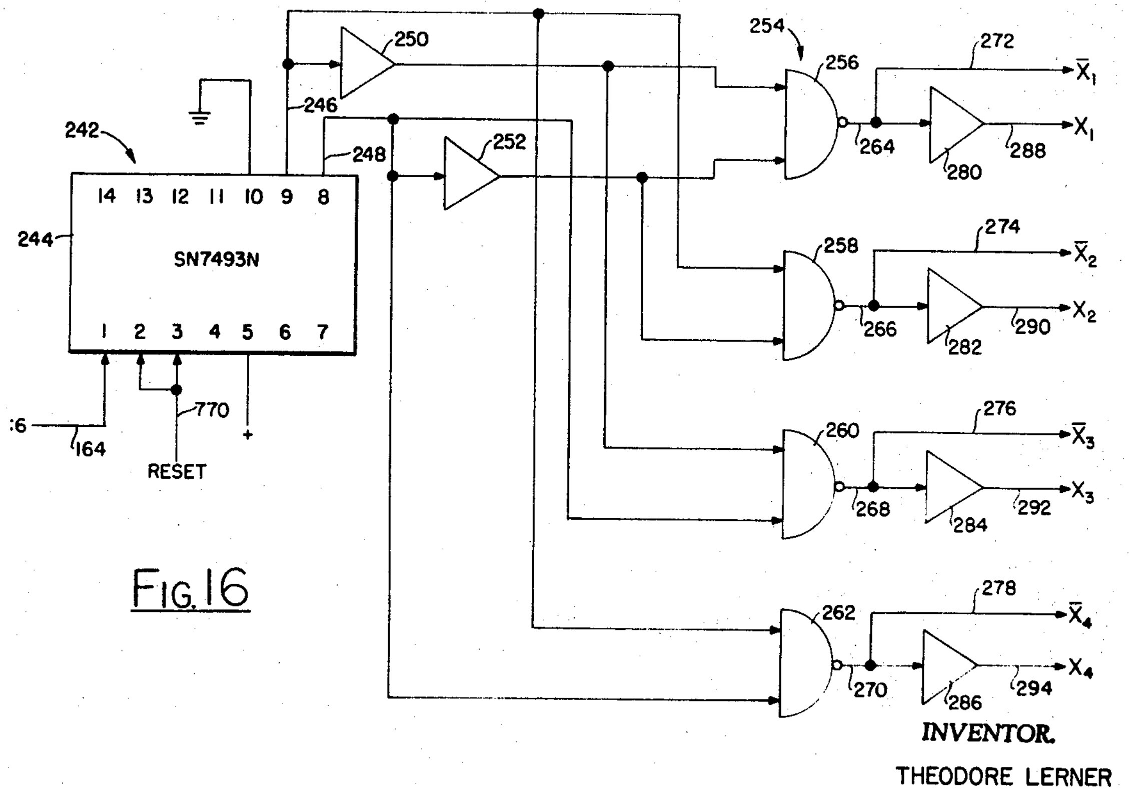
FIG. 16 is a circuit diagram illustrating another clock utilized in the transmitter.

The divide-by-four clock circuitry 242 of FIG. 12 which is connected both to the sample buffer output control 206 and to the sample buffer shift control 186 is illustrated in FIG. 16 and will be seen to include the integrated circuit counter 244 having input at the conductor 164 from the clock 158 of FIG. 15 and which has outputs at the conductors 246 and 248. The output at 248 has a pulse duration of 48 master clock pulses and a similar pulse interval whereas the output at 246 is at twice this rate. These outputs, and the inverse of these outputs as achieved by the inverters 250 and 252, are applied to a series of NAND gates 254 as inputs thereto such that during the duration of either a Q or a $\overline{Q}$ output of the flip-flop 180, the respective NAND gates 256, 258, 260 and 262 are actuated sequentially for successive and equal time durations. The outputs of these several NAND gates at 264, 266, 268 and 270 are taken directly at the conductors 272, 274, 276 and 278 and are inverted by the devices 280, 282, 284 and 286 to provide the complemental outputs at the conductors 288, 290, 292 and 294. It will be appreciated that in FIG. 12, the requisite plural connections between the clock 242 and the shift control 186 are symbolically shown as a single conductor 241 whereas the plural connections to the sample buffer output control are likewise shown as a single conductor 243.

Figure 17:
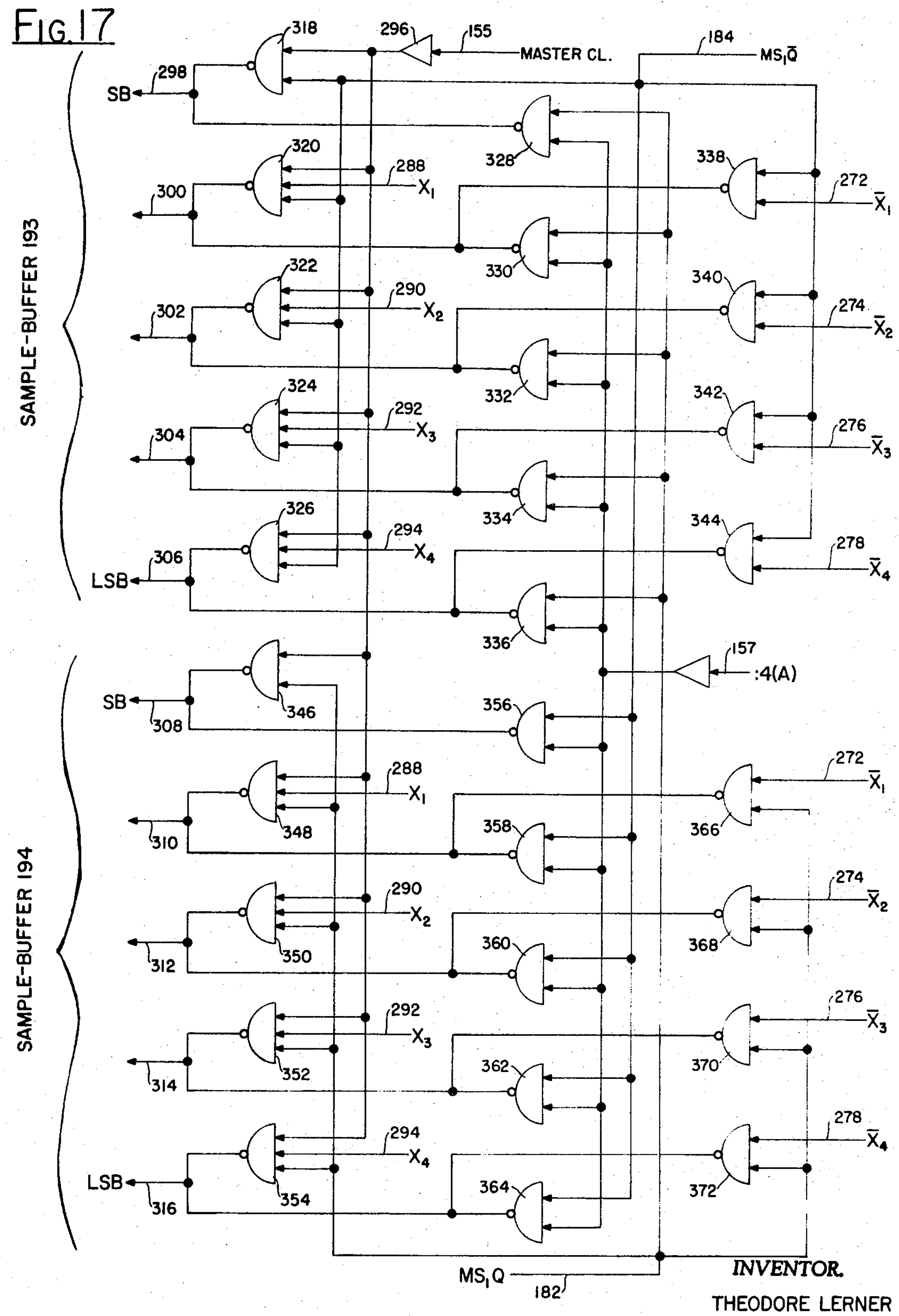
FIG. 17 is a circuit diagram illustrating the sample buffer shift control for the transmitter.

The sample buffer shift control circuitry 186 is shown in FIG. 17 and has, as inputs thereto, the two conductors 182 and 184 from the master switch flip-flop 180, the master clock input at 155 which is inverted at 296, and the inputs 272, 274, 276 and 278 as well as the inputs 288, 290, 292 and 294 from the circuitry of FIG. 16. There are two banks of output conductors from this shift control circuitry, the conductors 298, 300, 302, 304 and 306 which extend to the sample buffer 193 and the other bank of conductors 308, 310, 312, 314 and 316 which extend to the sample buffer 194. It will be understood that these banks of conductors are represented, for clarity, by the respective single conductors 188 and 190 in FIG. 12.

Corresponding to each bank of these conductors are three sets of NAND gates, the first of which is indicated by the reference characters 318, 320, 322, 324 and 326, the second set by the reference characters 328, 330, 332, 334 and 336, and the third set of which are designated by reference characters 338, 340, 342 and 344, all having the various inputs thereto as indicated in FIG. 17. For the other bank of conductors 308–316, there are corresponding sets of NAND gates 346, 348, 350, 352 and 354, the second set 356, 358, 360, 362 and 364, and the last set designated by reference characters 366, 368, 370 and 372.

It will be seen that when the input at the master switch conductor 182 is up while that at the conductor 184 is down, the first of gates 318, 320, 322, 324 and 326 for the sample buffer 193 are blocked as is the third set of gates 338, 340, 342 and 344 for this sample buffer. Thus, the only gates for the sample buffer 193 which are operative at this time is the second set of gates 328, 330, 332, 334 and 336 which also receive the inverted input from the clock conductor 157 (from FIG. 14) so that the sample buffer 193 is being shifted at the storage rate. The outputs of the conductors 298, 300, 302, 304 and 306 are identical while Q is up at conductor 182. The waveforms for the conductors 298, 300 and 302 are shown at the left in FIGS. 13*f*, 13*g* and 13*h* respectively, up until the time A which completes the sampling frame.

During this time, it will be noted that all of the gates 356, 358, 360, 362 and 364 comprising the second set for the sample buffer 194 are blocked whereas both the first and third sets of gates for this buffer are readied for operation due to the up input at the conductor 182. The sign bit shift gate 346 therefore produces a train of shift pulses at the master clock rate during the entire shifting cycle, the waveform at the conductor being shown at the right in FIG. 13*f* and being of a time duration of the corresponding waveform 13*i* OF THE RECEIVER. During the first quarter of the cycle, the $X_1$ output at the conductor 228 (FIG. 14) is up so that the gate 348 produces the pulse train output shown at the right of FIG. 13*g* at the conductor 310. As soon as the output $X_1$ goes down and its NOT $\overline{X}_1$ goes up, the output at the conductor 310 is down for the rest of the cycle until the time A when the sample buffer 194 goes into the storage mode.

Also during the first quarter of the cycle the output $\overline{X}_2$ is up, after which it goes down and $X_2$ goes up so that the gate 350 now produces, for the next quarter of the cycle, the train of output pulses as depicted at the right in FIG. 13*h*. Thereafter, its output is held down by the gate 368; the gate 352 passes the next series of shifting pulses; and thereafter the cycle is completed by the pulse train at the conductor 316 from the gate 354.

Thus, the sample buffers 193 and 194 store at one-fourth the rate at which they are shifted out.

The sample buffers are stored in parallel whereas they are shifted out in series. When the information stored in the sample buffer 193 is shifted out the most significant bits are first shifted out over the conductor 400 (FIG. 12), then the next bits of significance over the conductor 402, the next over the conductor 404, and the least significant bits are shifted out last over the conductor 406. The sign bit appearing at the conductor 408 is shifted out continuously and it is recycled so that the appropriate sign bit associated with the occurrence of a "one" or thirty consecutive "zeros" is present continuously.

Figure 18:
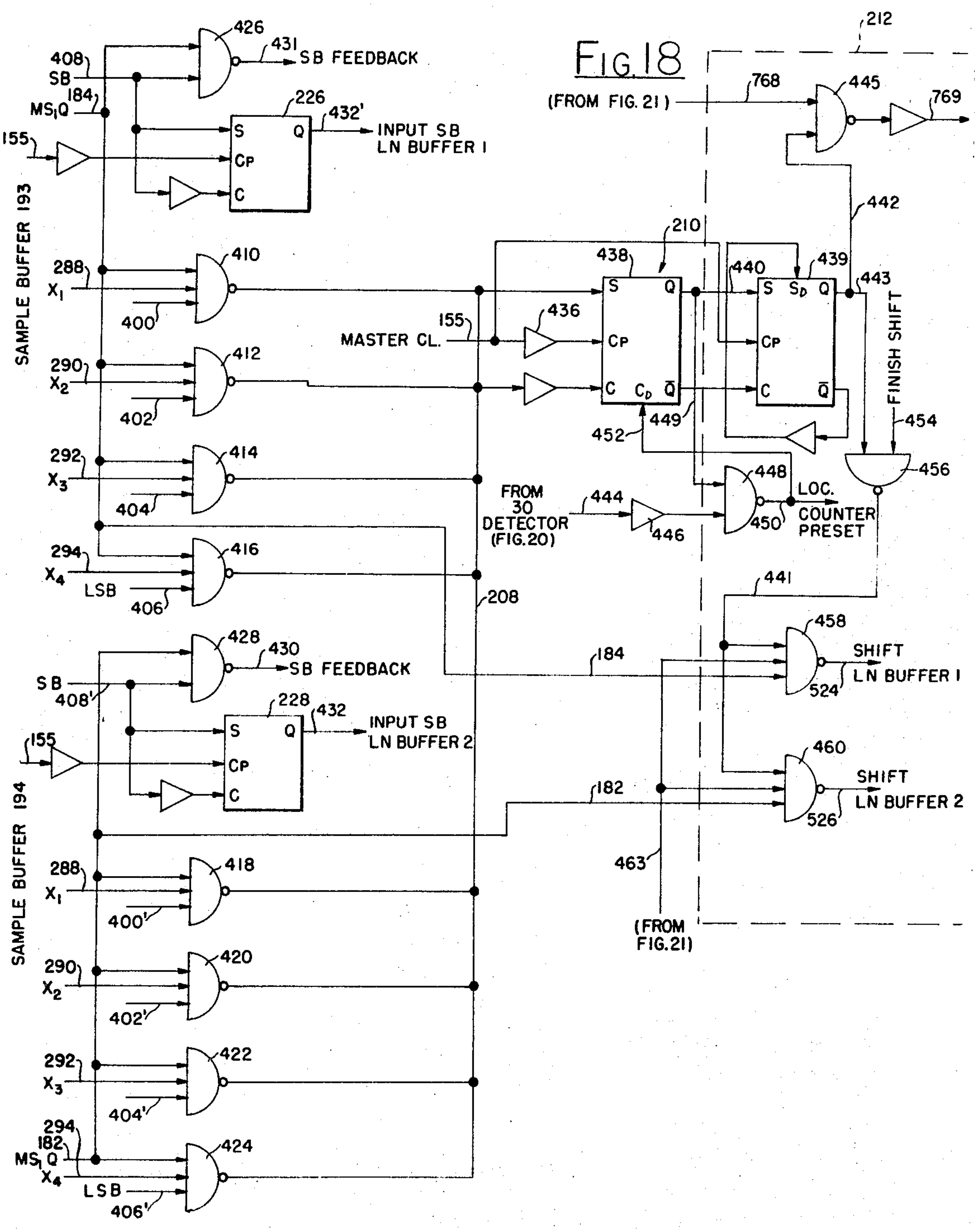
FIG. 18 is a circuit diagram illustrating the sample buffer output control, the "one" detector and the shift, preset and reset control for the location number buffers.

The sample buffer output control 206 is shown in FIG. 18. As shown in this figure, there are two sets of NAND gates, the gates 410, 412, 414 and 416 and the gates 418, 420, 422 and 424, associated with the respective sample buffers 193 and 194. Additionally, there are the two sign bit feedback gates 426 and 428. As will be apparent, when the signal at 184 is down, all the gates 426, 410, 412, 414 and 416 are blocked whereas the gates 418, 420, 422, 424 and 428 have the input from the conductor 182 which is up. Therefore, when a sign bit "one" appears at the conductor 408', for example, an output at the feedback conductor 430 is fed back into the sample buffer 194. It will be appreciated that the serial outshifting from the sample buffers 193 and 194 is such that all of the most significant bits are shifted out first, then the next most significant bits, etc., as in accord with the explanation of FIG. 8. Since the location numbers contain information as to the location of "ones" in these bits of significance as well as the signs of the sign bits, the recycling of the sign bits is necessary. This is accomplished by the NAND gates 426 and 428 and then additionally shown in FIG. 12.

With reference to FIG. 12, assuming the Q output of the master switch 180 to be up so that the sample buffer 193 is storing, whereas the sample buffer 194 is being shifted out, it will be noted that the down output at the conductor 184 will assure that the respective gates 202 and 426 of the buffers 194 and 193, respectively, will remain down during the frame or cycle. As a result, the feedback and input gate 207' of the buffer 193 will respond properly to store the successive sign bits in the buffer 193. At the same time, the up output at 182 will assure the proper logic at the gate 200 at the input to the sample buffer 193 and will also produce a normally up input to the feedback gate 428 of the sample buffer 194, so that when a one is present at the sign bit conductor 408', the output at 430 goes down so that the gate 207 inserts a one back into the sample buffer 194 at the conductor 209. Thus, the sign bits are recycled during the outshifting from the sample buffers.

Figure 22:
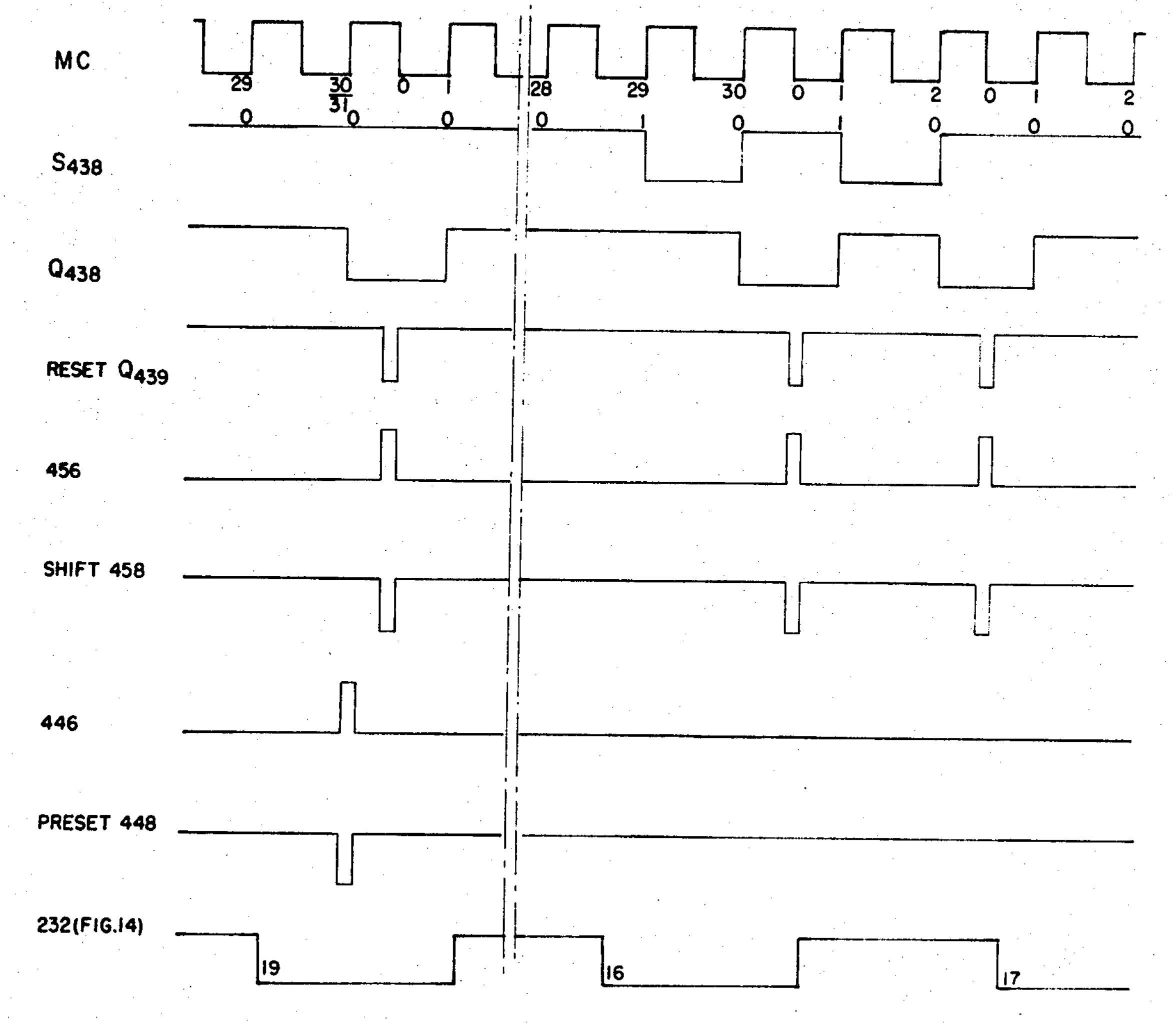
FIG. 22 is a timing diagram associated with FIG. 18.

FIG. 18 also shows the one detector 210 as well as the shift, preset and reset control 212, both of which are indicated generally in FIG. 12. The register 438 in FIG. 18 has inputs from the conductor 208 of FIG. 12 which is the bit stream as shown in FIG. 18 from the gates 410, 412, 414, 416 or gates 418, 420, 422, 424, exclusive of the sign bits at the conductors 432 and 432'. A timing diagram in association with the mechanism 210 and 212 is shown in FIG. 22. With reference both to FIGS. 18 and 22, it will be appreciated that the bit stream appearing at the conductor 208 as well as the count in the location counter are being stepped in accord with the NOT of the master clock so that the location counter counts and the bits appear at the conductor 208 as the master clock NOT falls. This is represented for the location counter by the numbers appearing below the top line of FIG. 22 and for the bits by the "zeros" or "ones" appearing above the second line of FIG. 22.

For the condition at the left-hand side of FIG. 22, a string of 30 consecutive "zeros" have appeared so that the gate 448 presets the location counter to 30 and sets the $\overline{Q}$ of the binary 438 so that as the next master clock pulse falls, the Q of the binary 439 goes down to shift the number 30 into the location number buffer and to reset the location counter to zero. Then, in the next falling master clock NOT pulse, the location counter steps to the number one for the next location count. The input at S to the binary 438 remains unchanged because no "one" has appeared in the bit stream.

For the condition shown on the right-hand side of FIG. 22, a string of 29 "zeros" have appeared before a "one" is encountered. The "one" causes the S of the binary 438 to go down and on the falling of the next master clock NOT, the Q of this binary goes down. In the meantime, the location counter has counted to the number thirty and the Q of the binary 439 then goes down with the falling of the next master clock pulse to shift this number into the location number buffer and to reset the location counter to the number zero. The next falling of the master clock NOT steps the location counter to the number one and, at the same time, another "one" has appeared in the bit stream, causing another cycle as just described so that the location number two is shifted into the location number buffer and the location counter reset to zero as before.

The clock pulse for the binary 438 is the NOT of the master clock pulse at 155 as effected by the inverter 436 so that its Q output at the conductor 440 is changed as the master clock NOT falls should a "zero" appear on the conductor 208. Since the clock for the binary 439 is the master clock, its Q output may change when the master clock pulse falls, corresponding to cause the outputs at 442 and 443 to go down. The signal on the conductor 443 will cause the output on the conductor 441 of the NAND gate 456 to go up to cause one of the NAND gates 458 or 460 to respond at their outputs 524 or 526, dependent upon which of the master switch conductors 182 or 184 is up. The other inputs to the gates 458 and 460 at the conductor 463 will be described later in conjunction with FIG. 21. Likewise, the finish-shift conductor 454 connected to the gate 456 will be described later.

The location counter reset signal on the conductor 442 is applied to the NAND gate 445 whose other input at the conductor 768 is normally up, again to be described later, so that the inverted output of the gate 445 at the conductor 769 is used for resetting the location counter.

Whenever the location counter counts thirty and there is no "zero" on the conductor 208, the conductor 444 from the thirty detector produces through the inverter 446 an up input to the NAND gate 448. The Q of the binary 438 will be up also at this time so that the output 450 of the gate 448 goes down to preset the location counter and through conductor 452 to set the Q of the binary 438 to zero. This immediately blocks the gate 448 and, on the next falling of a master clock pulse, the binary 439 responds to reset the location counter and shift the location number buffer, as before.

When the 30 detector responds at the time that a "-zero" is also present on the conductor 208, i.e., when the thirtieth bit is a "one," the down Q output of the binary 438 blocks the gate 448 so that no location counter preset is applied.

Figure 20:
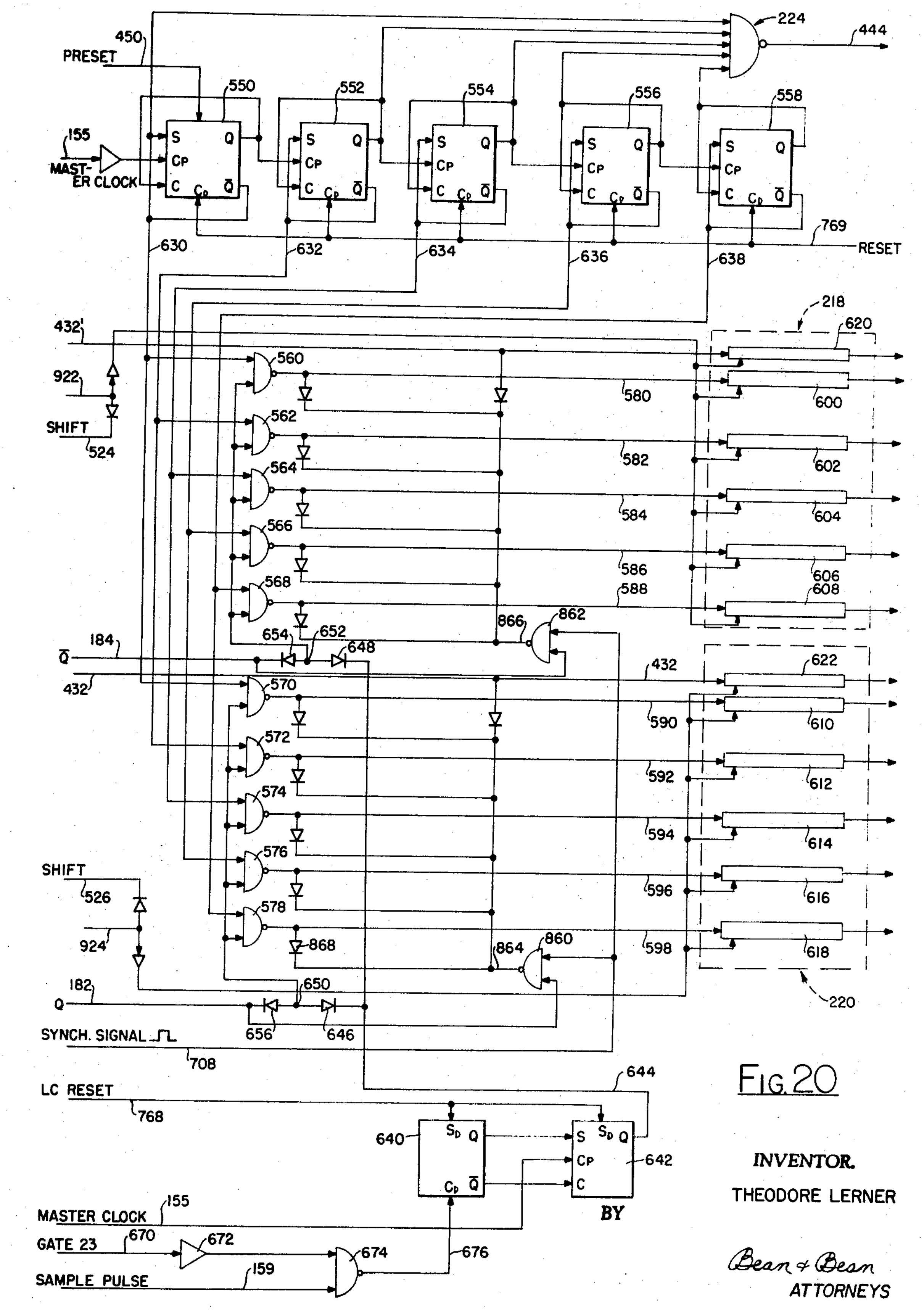
FIG. 20 is a circuit diagram illustrating the location counter, the location number buffer input control, the location number buffers as well as ancillary control devices utilized in conjunction with a finish-shift operation.

The location counter 214 and the location buffer input controls as well as the location buffers themselves are indicated in FIG. 20 in detail. As illustrated, the location counter comprises the five registers 550, 552, 554, 556 and 558. Two banks of NAND gates 560, 562, 564, 566 and 568 and the bank 570, 572, 574, 576 and 578 are provided, under the control of the two conductors 182 and 184 which are the outputs from the master switch 180, these gates having the $\overline{Q}$ inputs of the registers 550, 552, 554, 556 and 558 as the other inputs thereto with their outputs at 580, 582, 584, 586 and 588 and the conductors 590, 592, 594, 596 and 598 connected to the respective registers 600, 602, 604, 606, 608 and 610, 612, 614, 616, 618 of the two location number buffers 218 and 220. The sign bit registers 620 and 622 are connected to the previously mentioned conductors 432' and 432. The thirty detector 224 is a NAND gate as shown connected to the Q outputs of the register 552, 554, 556, 558 and to the $\bar{Q}$ output of the register 550. When preset to thirty-one, the location counter produces down signals at all of the $\bar{Q}$ outputs of the registers at the conductors 630, 633, 634, 636 and 638 so that the outputs of the appropriate bank of NAND gates controlling the inputs of the location numbers to the buffers 218 and 220 are up. Consequently, the digital number 11111 is the location number 31. The location number zero which, digitally, is the number 00000 is reserved for a synchronizing signal as will hereinafter be described which is the reason why thirty consecutive zeros rather than 31 consecutive zeros is chosen as the cutoff point for a string of consecutive zeros in the bits of significance.

As mentioned hereinbefore, there will be, on the average, fewer than five location numbers per frame and at any time that there are fewer than eight location numbers in a frame, the location buffers are finish shifted to fill them completely with the last location number registered being a zero for synchronization. That is to say, assume that there are six location numbers which have been shifted into one or the other of the location number buffers during the major portion of the frame. At some small terminal portion of each frame, time is reserved for shifting the seventh location number which is a 31 into the appropriate location number buffer and then the eighth number shifted in is a zero and this eighth number is utilized for synchronization between the transmitter and the receiver as will hereinafter appear.

To prepare for the shifting in of the numbers 31 to fill in a full frame complement of location numbers, the two registers 640 and 642 are utilized. The Q outputs of these two registers 640 and 642 normally are up, being reset to "one" by the location counter reset conductor 768. The Q output conductor 644 of the register 642 therefore is normally up, such register being stepped by the master clock as indicated by the conductors 155. The conductor 644 is connected through the respective diodes 646 and 648 to the terminal points 650 and 652 which serve as the input points to the gates 560–568 and 570–578 the further diodes 654 and 656 serving to connect this junction point with the $\bar{Q}$ and Q outputs of the master switch 180 through the conductors 184 and 182 respectively, as shown. During the terminal portion of each frame when the output conductor 670 from the next-to-last multiplexing gate of FIG. 19 is down (specifically at the beginning of the sampling period number 23 from the gate 23 in FIG. 19) and the output of this gate as inverted at 672 is applied as an input to the NAND gate 674 (FIG. 20), a subsequent sampling pulse occuring at the conductor 159 causes the output at the conductor 676 from the NAND gate 674 to set the register 640 so that its Q output is down whereby on the next clock pulse, the Q output at the conductor 644 of the register 642 also goes down. This blocks both sets of gates 560–568 and 570–578 so that all of their outputs are up, overriding the control from the conductors 182 and 184 from the master switch. This sequence is shown in the timing diagram of FIG. 23 wherein the inverted output 700 of the multiplex gate number 23 is shown, the sample pulse is indicated by the reference character 702 and the down outputs of the two registers 640 and 642 are indicated by reference characters 704 and 706. The corresponding numbers 31 which may be shifted to fill the location number buffers when the finish-shift operation is performed as hereinafter described are consequently present. The location number zero which occurs for the last location number shifted into any empty frame sequence is achieved by virtue of a synchronization signal applied at the conductors 708 in FIG. 20 and provided from a circuitry hereinafter described from FIG. 21.

Figure 21:
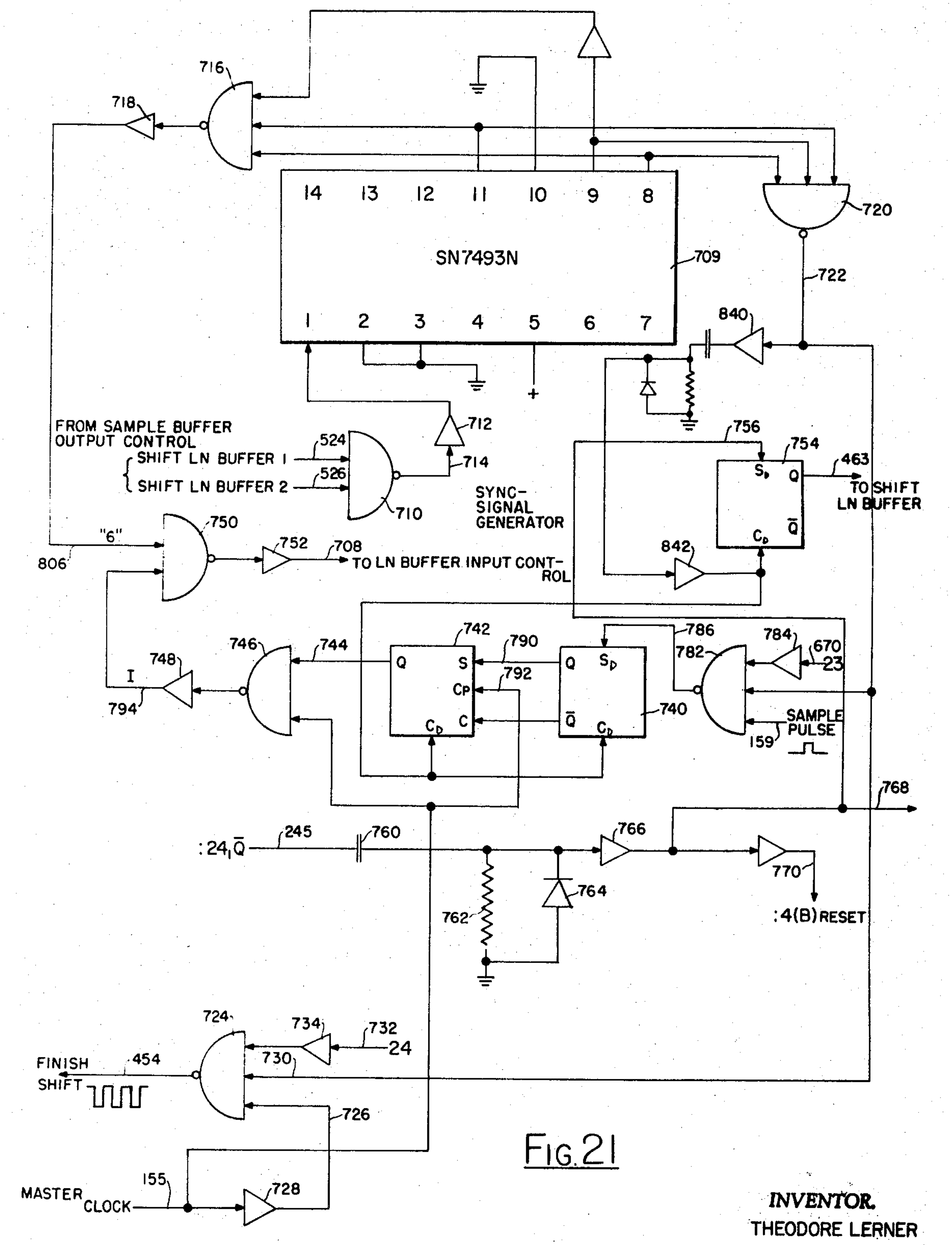
FIG. 21 is a circuit diagram showing the counter for the location number input to the location number buffers, the synchronization signal generator and the finish-shift circuit.

The input counter, the synchronization signal generator and finish-shift circuitry are shown in FIG. 21. The location number input counter clock 709 counts the outputs of the NAND gate 710 whose output, inverted at 712, occurs by virtue of the shift pulses from the conductors 524 and 526. The output of the NAND gate 710 at its conductor 714 normally is down since it will be recalled that both inputs at the conductors 524 and 526 are normally up. Therefore, when a negative going shift pulse occurs at one of the conductors 524 and 526, the output of the gate 710 goes up to step the counter 709. The outputs of the counter 709 are connected so that the NAND gate 716 has an output inverted at 718 which goes up after the count of seven, the NAND gate 720 having an output at the conductor 722 which goes down after the count of eight. The finish-shift NAND gate 724 has an output at the conductor 454 previously described in conjunction with FIG. 18 and has inputs at the conductor 726 which is the master clock pulse inverted as at 728, the input at the conductor 730 which is the normally up output of the NAND gate 720, and the inverted output of the multiplexing gate number 24 at the conductor 732 which is inverted at 734. Thus, the finish-shift operation occurs during the interval of the inverted output of the multiplexing gate number 24 in FIG. 19 which is indicated by the pulse 736 in FIG. 23.

In addition, there are the two registers 740 and 742 which cumulatively provide one input at the conductor 744 to the NAND gate 746 whose output is inverted at 748 and applied as the other input to the NAND gate 750. The output of the NAND gate 750 is inverted at 752 and provides the synchronizing signal at the conductor 708 previously described in conjunction with FIG. 20. FIG. 21 also shows register 754 which provides the signal at the conductor 463 enabling shifting of the location number buffers. The register 754 has its Q output at the conductor 463 normally set to one by the signal appearing at the conductor 756 which occurs from control by the conductor 245 connected as shown in FIG. 15 to the $\bar{Q}$ output of the device 243 whose output goes up at the end of a frame. This pulse is differentiated as indicated by the capacitor 760, resistor 762 and diode 764 to provide a spike inverted at 766 which not only sets the register 754 so that its Q output is up at the beginning of the next frame or cycle but which also resets the location counter as indicated at 768 and which is also provided to assure reset of the clock shown in FIG. 16 by providing a reset pulse at the conductor 770.

Figure 23:
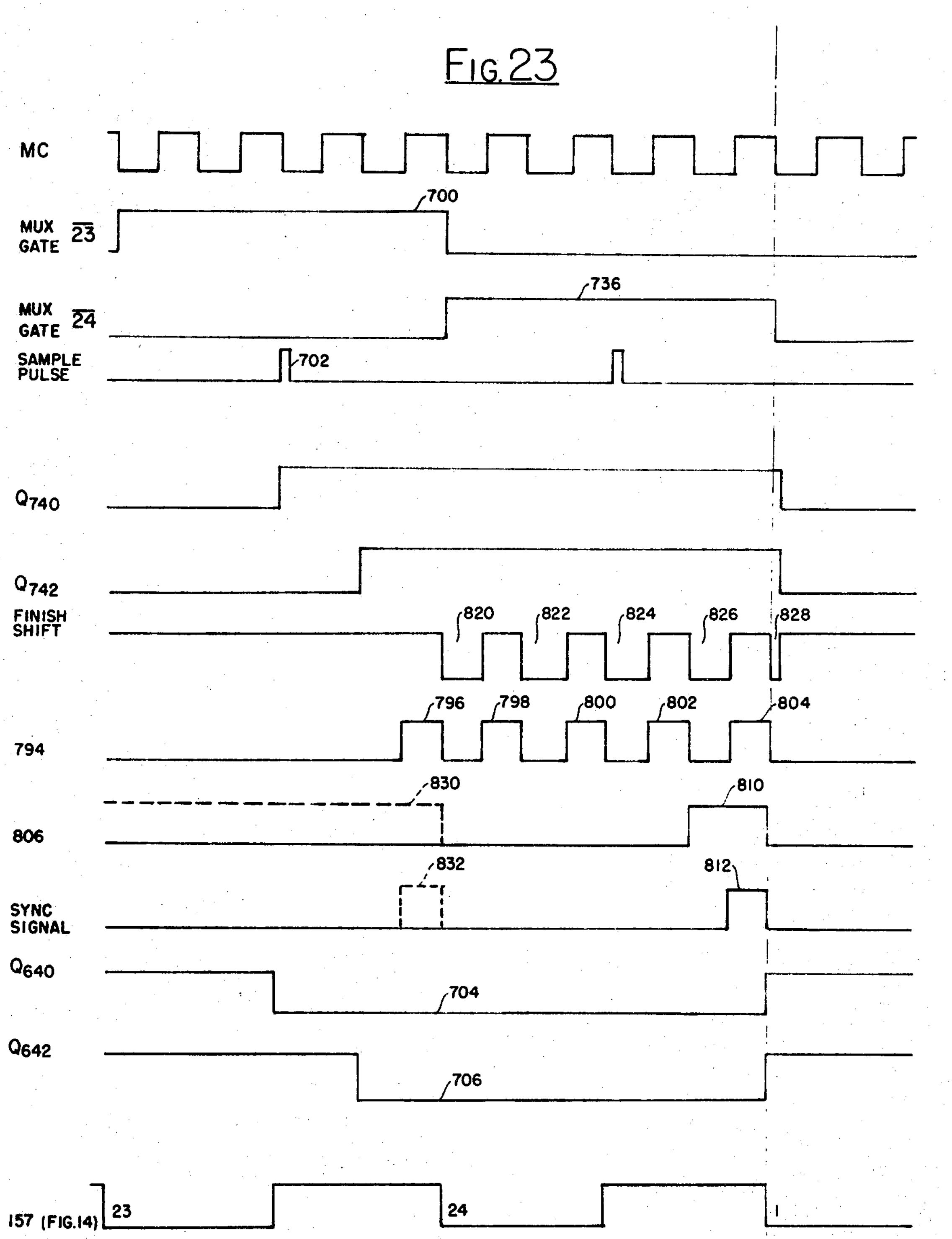
FIG. 23 is a timing diagram associated with FIGS. 20 and 21.

In conjunction with the timing diagram of FIG. 23, first consider the case wherein only three location numbers have been generated by the time the multiplex gate output at conductor 670 in FIG. 19 goes down, corresponding to the pulse 700 in FIG. 23. As stated before, the sample pulse 702 coincident therewith is applied at the conductor 159 as one input to the NAND gate 782, the output at the conductor 670 being inverted at 784 and applied as another input to the NAND gate 782. The output from the gate 720 is still up because the counter 709 has registered only three location numbers; the output of the gate 782 at the conductor 786 consequently sets the Q output at 790 of the register 740 up so that, on the next clock pulse applied at the input 792, the Q output at 744 of the register 742 goes up. The two inputs to the gate 746 are at this time up so that its inverted output at the conductor 794 is also up during each master clock pulse, as indicated by the five pulses 796, 798, 800, 802 and 804 in FIG. 23. The other input to the gate 750 at the conductor 806 from the inverter 718 does not occur until the seventh location number is shifted into the buffer as indicated by the pulse 810 in FIG. 23. Thus, the synchronization pulse 812 does not occur until the last pulse 804 at the conductor 794 which, as will be seen, overlaps with the last shift pulse of the finish-shift operation.

The finish-shift operation itself occurs whenever the output from the gate 720 is still up and the inverted output from the multiplex gate number 24 goes up to the gate 724 as previously described, the finish-shift pulses 820, 822, 824, 826 and 828 continuing to fill the eight location numbers in the buffer, the first three of which were the location numbers mentioned before followed by four 31 and finally a zero which is the sync signal which is stored last in the location number buffer and completes the filling of same.

In the event, for example, that there are seven location numbers which have been inserted into the location number buffer by the time the sampling pulse 702 occurs during the actuation of the gate number 23 in FIG. 19, only one finish-shift pulse will occur because the output of the gate 720 will then go down to block the gate 724 and this last shift will shift the number zero, the synchronization number, into the appropriate location number buffer. The reason for this is that with seven location numbers already generated, the input 830 from the conductor 806 will already be up as indicated by dashed lines in FIG. 23 so that one synchronization signal pulse 832 will be generated to fill the buffer. When the output of the gate 720 goes down at its output conductor 722, it is inverted at 840, differentiated and inverted again at 842 to set the Q output of the gate 754 to zero thus blocking further shifting of the location number buffers and it also sets the two gates 740 and 742 so that their Q outputs are down.

The synchronization signal at the conductor 708 is connected as shown in FIG. 20 as one of the inputs to the two gates 860 and 862. When a synchronization signal occurs, dependent upon which of the outputs is up at the conductor 182 or the conductor 184, the appropriate gate 860 or 862 will produce a down output at its output conductor 864 or 866 which, being connected to the sign bit input conductor 432' or 432 as the case may be and to the respective inputs to the remainder of the location number buffer registers through diodes as indicated by the reference character 868, for example, will pull the remainder of the inputs to the location number buffer registers down so that the number zero will be shifted as the last number into the location number buffer, that is, corresponding to the eighth location number in the appropriate buffer.

Figure 24:
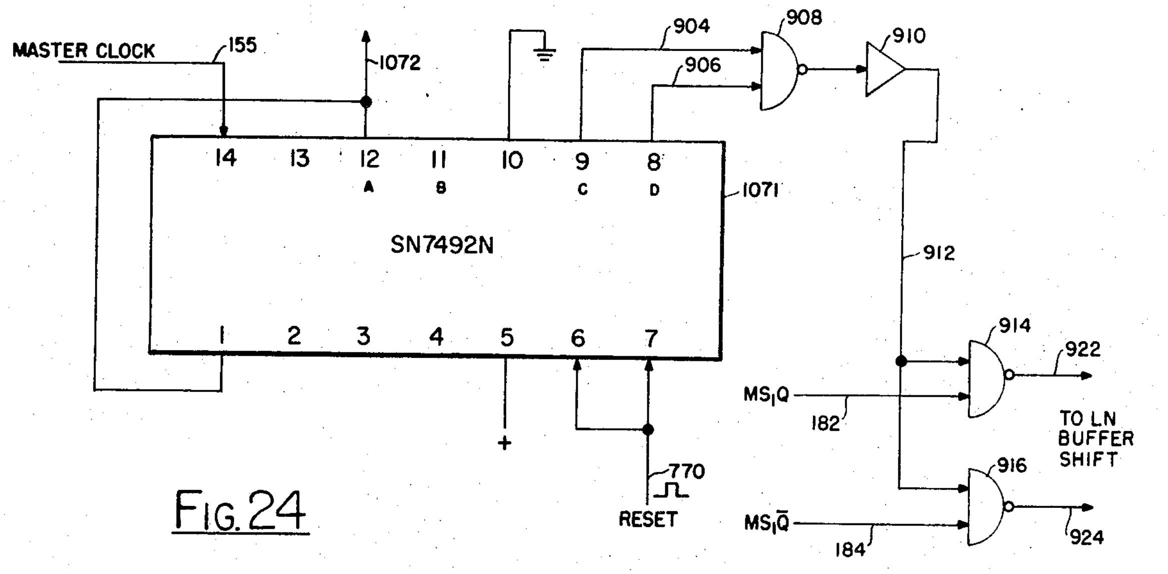
FIG. 24 is a circuit diagram of the clock for control transmission of the location numbers.

As previously stated, the location number words are shifted out of the location number buffers for transmission to the receiver portion of the system at a uniform rate. Since there are eight location numbers per frame whereas there are 96 master clock pulses per frame, the rate of transmission is one-twelfth that of the master clock rate. FIG. 24 shows the transmission clock which comprises the counter 1071 having an input at 155 from the master clock and which has outputs at the conductor 904 and 906 respectively which are applied as inputs to the NAND gate 908 whose output is inverted at 910 and applied at conductor 912 as one input to each of the two NAND gates 914 and 916. The other inputs to these two gates 914 and 916 are from the master control switch Q and $\bar{Q}$ outputs. The gates 914 and 916 control shifting of the location number buffers during the transmission outshifting thereof.

Figure 25:
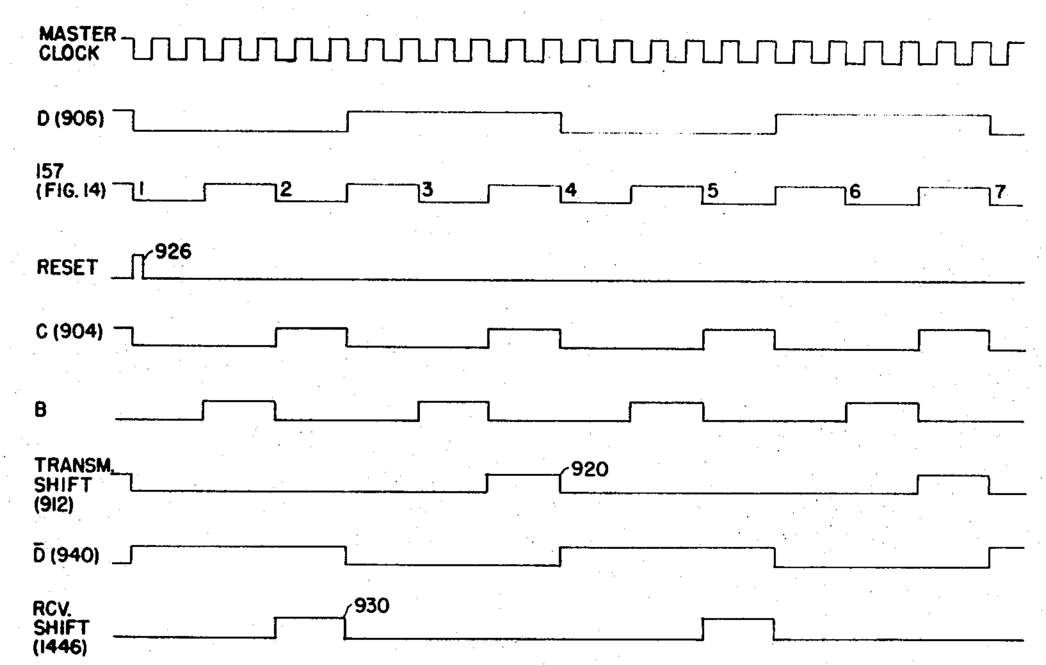
FIG. 25 is a timing diagram illustrating the principle of the clock of FIG. 24, and also relating the timing of the shifting for the location number buffers at the receiver.

FIG. 25 is a timing diagram illustrating the principles of the transmission clock of FIG. 24. The top line of FIG. 25 shows the master clock timing whereas the second and fifth lines show the outputs at the conductors 906 and 904 respectively. Whenever the outputs at these two conductors are simultaneously up, a transmission shift pulse, the inverse of that indicated by the reference character 920, is provided at one of the conductors 922 or 924 from the two NAND gates 914 and 916. A reset pulse is applied to the transmission clock from the conductor 770 described in conjunction with FIG. 21, such reset pulse being indicated by the reference character 926 in the fourth line of FIG. 25 and coinciding, as is indicated by the third line of FIG. 25, with the beginning of a frame sequence.

The last line of FIG. 25 shows the timing relationship of the shifting of the received location words into the appropriate location number buffer at the receiver, as will be described later.

Figure 26:
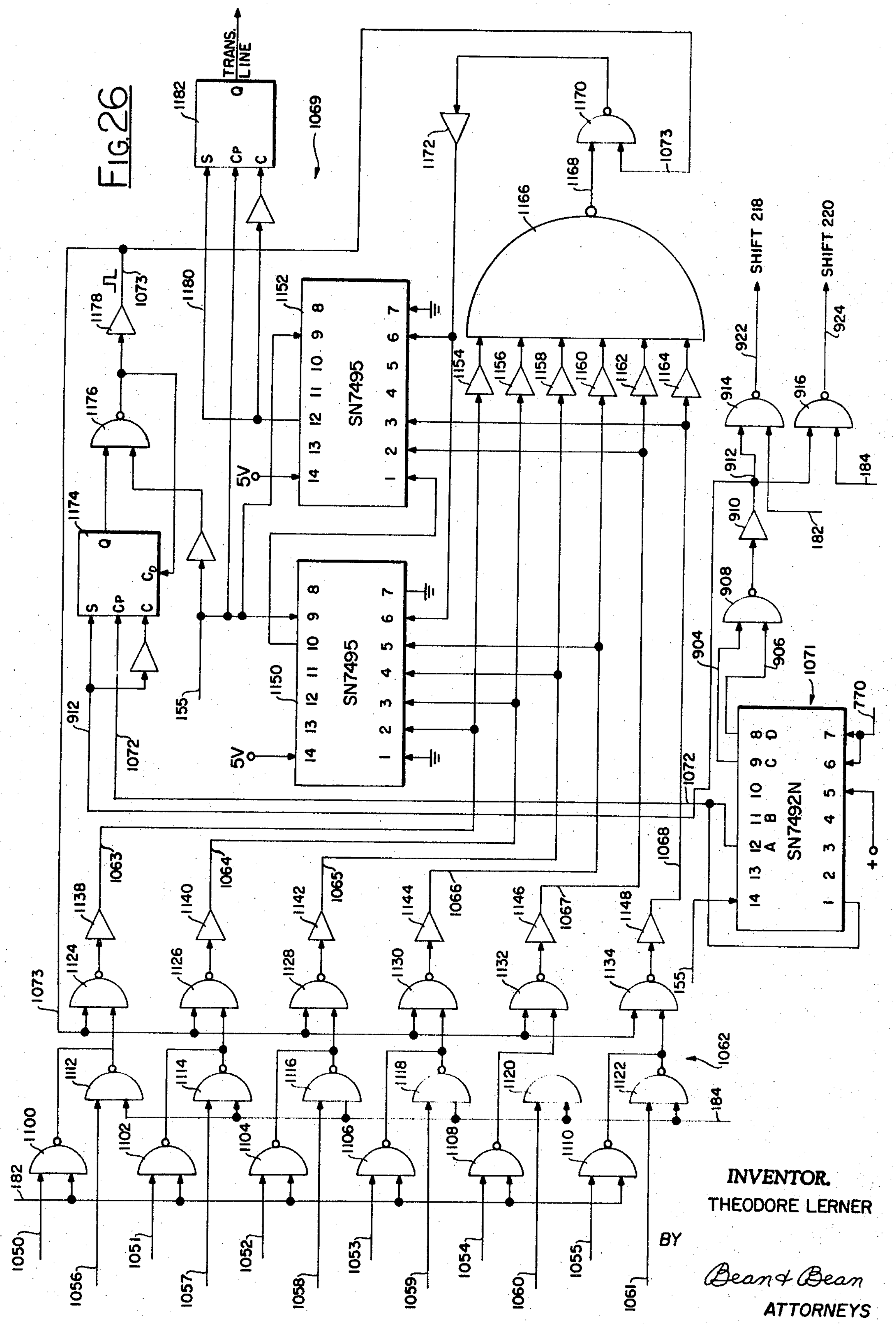
FIG. 26 is a circuit diagram of the transmission clock, location number buffer output control and location number serializer.

FIG. 26 illustrates the location number buffer output control and the transmission control system. The output conductors 1050–1055 from the location number buffer 218 (FIG. 20) are connected to a bank of NAND gates 1100, 1102, 1104, 1106, 1108 and 1110 which have the master switch conductor 182 also connected thereto, whereas the output conductors 1056–1061 of the location number buffer 220 are connected to the bank of NAND gates 1112, 1114, 1116, 1118, 1120 and 1122 which are in turn connected to the master switch conductor 184. Thus, dependent upon which of the location number buffers is being outshifted, one or the other of the banks of NAND gates will be operative.

Both banks of NAND gates have their outputs connected to the bank of NAND gates 1124, 1126, 1128, 1130, 1132 and 1134, the other inputs to these NAND gates being provided by the conductor 1073 as hereinafter described. This latter bank of gates are connected as shown, through the inverters 1138, 1140, 1142, 1144, 1146 and 1148, to the shift register composed of the two solid state components 1150 and 1152 and, through the inverters 1154, 1156, 1158, 1160, 1162 and 1164, to the NAND gate 1166.

The gate 1166 in conjunction with the gate 1170 and the inverter 1172 provides the signal to store the six-bit location number in the register 1150,1152 at the proper time and the master clock signal at the conductor 155 shifts out the stored bits of the location number in the register so that these bits appear in serial sequence at the output conductor 1180.

It will be recalled from the discussion of FIGS. 7, 8*a*, 8*b* and 8*c* that the voice samples were quantized to 32 levels, with the parallel-stored words representing these voice samples being shifted out in serial fashion to obtain the 6-bit location number words of FIG. 8*c*. Since we know that there will be a preponderance of "zeros" in the voice sample words, we also know that the location number words will contain, on the average, more "ones" than "zeros." It is for this reason that the inverters 1138–1148 are used. The outputs of these inverters are the complements of the 6-bit location number words so that the duty cycle of the transmitter may be minimized.

The binary 1174, NAND gate 1176 and inverter 1178 provide the signal at the conductor 1073 so as to allow the location number words complement to be applied to the shift register 1150,1152 whereas the gate 1166, gate 1170 and inverter 1172 cause this complement to be stored in the register, the gate 1170 also being under control of the signal at the conductor 1073. The primary control function is of course provided by the transmitter clock 1071 as described in conjunction with FIGS. 24 and 25.

Thus, the transmitter shift pulses 920 (FIG. 25) are provided at the output 912 of the inverter 910 not only to cause the next location number word to be shifted out of the appropriate buffer 218 or 220, but also to control the binary 1174 in conjunction with the signal at the conductor 1072 so that the signal at the conductor 1073 goes up with the falling of the pulse 920 (FIG. 25). The signal at the conductor 1072 is at one-half the master clock rate.

It will be recalled that the first five bits of the location number words may indicate the numbers 1 through 31 and that the last bit is the sign bit of the binary voice sample. Thus, the location number words may be any one of the 5-bit combinations 00001–11111 inclusive, plus either a 0 or a 1 as the sixth or sign bit. The filler word is, of course, the word 111111 whereas the synchronization word 000000 is unique. It will be evident that the gate 1166 will produce an up output at the conductor 1168 for every location number word except for the word 111111 and will, absent this exception, produce a "store" signal at the output of the inverter 1172. Thus, the complement of every location number word except the complement 000000 of the aforesaid word 111111 will be stored for serial outshifting at the master clock rate and transmission in such serial fashion through the binary 1182. This exception presents no amibguity since the transmitter will transmit no signals, precisely what it would have transmitted had the complement been stored. As will appear hereinafter, the inverted logic transmitted is reinverted at the receiver.

THE RECEIVER

Figure 27:
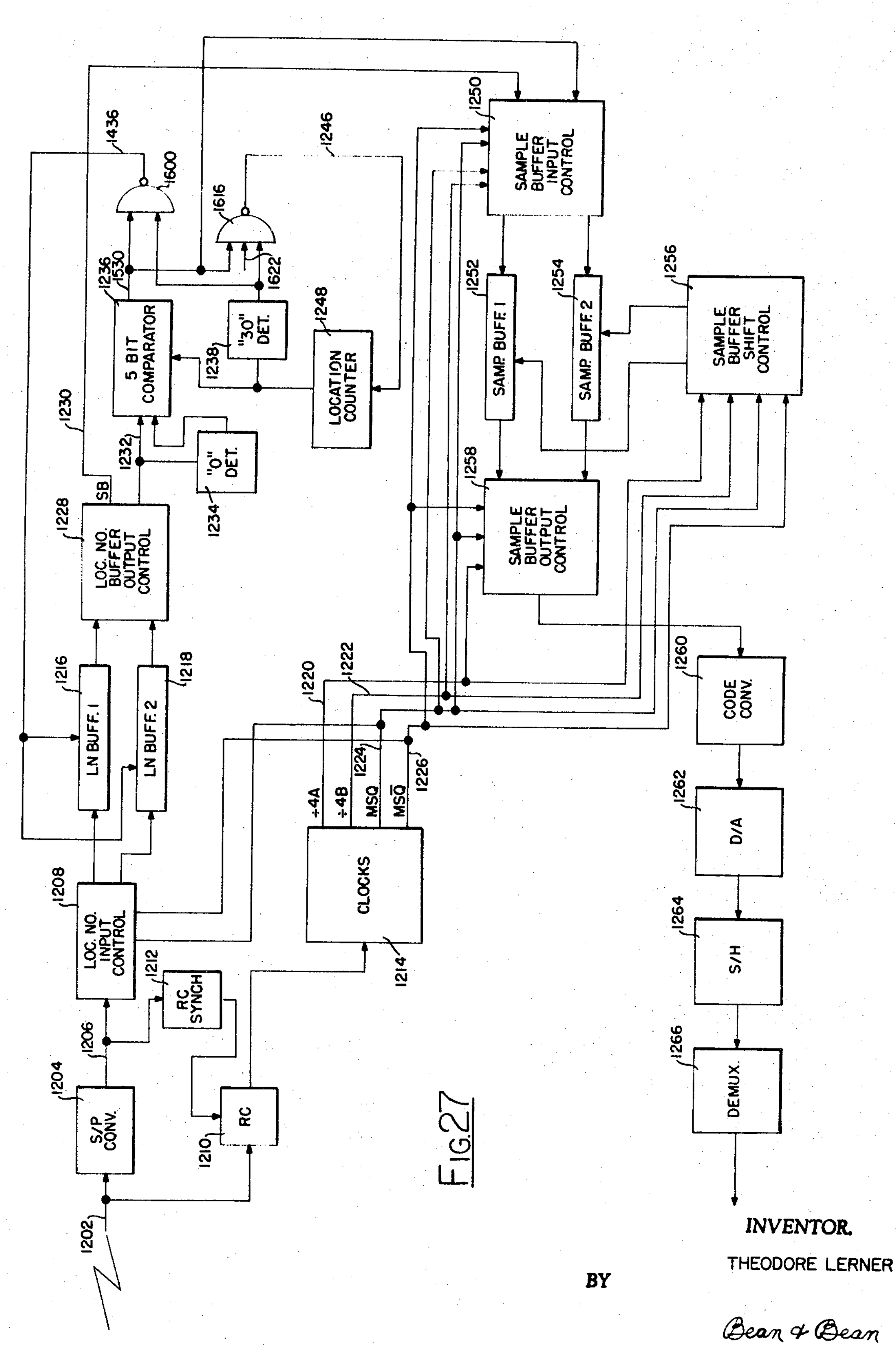
FIG. 27 is a block diagram illustrating the principles of the receiver portion of the preferred embodiment.

FIG. 27 illustrates the general principles of the receiver system. The location number word complements transmitted as described in conjunction with FIG. 26 are received at the conductor 1202 and applied both to the serial-to-parallel converter 1204 and the receiver clock 1210. The output 1206 of the converter 1204 is applied to a synchronization system 1212 to assure synchronization between the clock systems of the transmitter and the receiver, and the receiver master clock 1210 has an output to the clock system 1214 which has outputs at 1220, 1222, 1224 and 1226 corresponding to the clock system described in conjunction with the transmitter.

The receiver also includes the location buffer input control 1208, the location number buffers 1216 and 1218 and the location number buffer output control 1228. The sixth or sign bit of each location number word is applied over the conductor 1230 to the sample buffer input control 1250 while the other five bits of each location number word are applied to the 5-bit comparator 1236 and to the "zero" detector 1234. The 5-bit comparator 1236 operates in conjunction with the location counter 1248 and other controls hereinafter described to reconstruct the voice sample words and store them in one or the other of the sample word buffers 1252 or 1254. In addition to the sample buffer input control 1250, a sample buffer shift control 1256 and a sample buffer output control 1258 are provided. The out-shifted sample words are applied to the code converter 1260 and from there to the digital-to-analog converter 1262 and then the sample and hold circuit 1264 whereafter the analog signals are demultiplexed by the circuit 1266.

It will be seen that this latter portion of the receiver is essentially the inverse of the transmitter processing and will not be described in detail since the requisite processing is obvious. It should also be noted that with the exceptions noted hereinafter, the receiver clock system is identical in operation and construction with that of the transmitter. The receiver master clock is synchronized with but operates 180° out of phase with the transmitter master clock.

Figure 28:
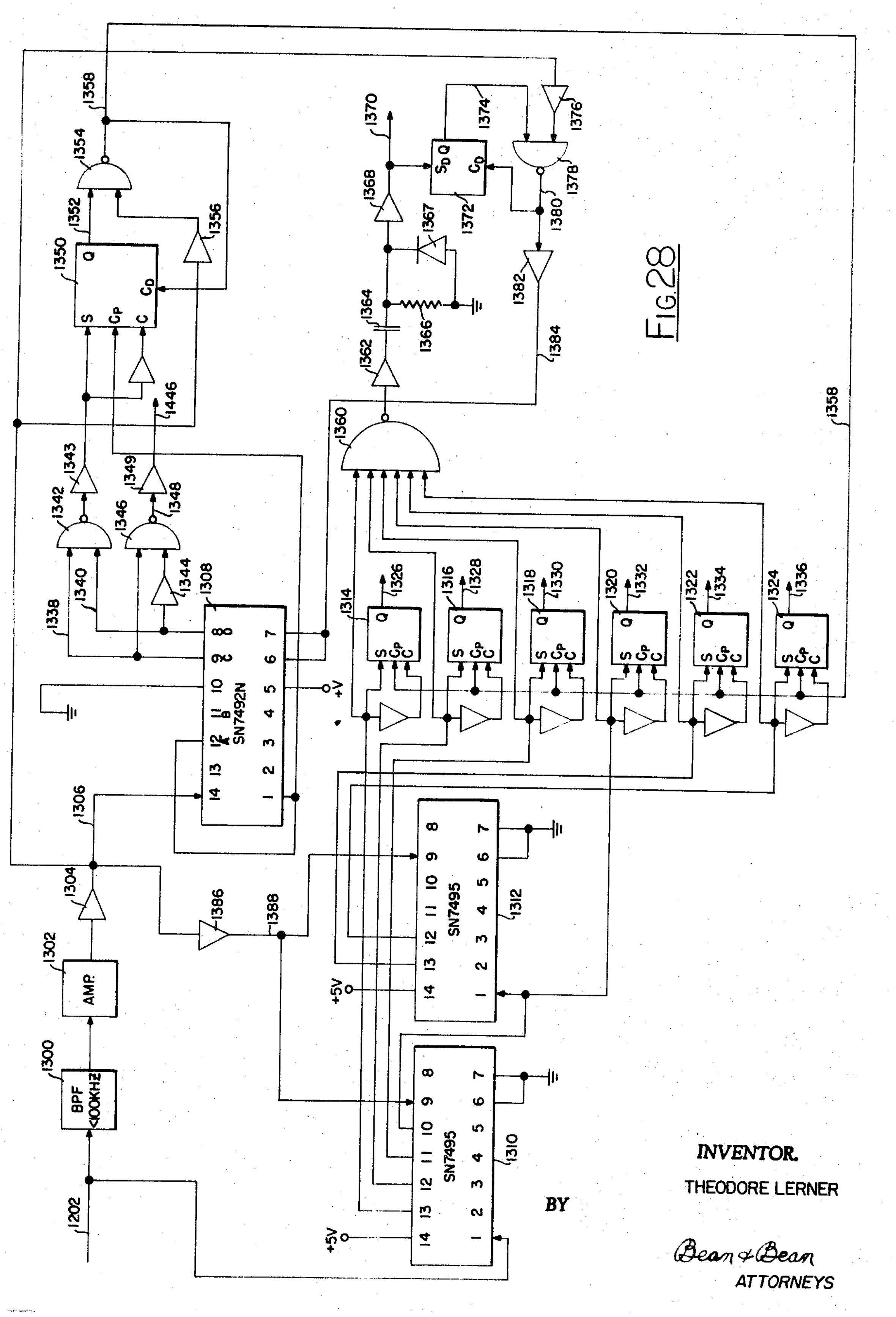
FIG. 28 is a circuit diagram illustrating the master clock, the reception clock, the serial-to-parallel converter, the parallel shift and receiver clock synchronizing circuits of FIG. 27.

The master clock for the receiver is comprised of the band pass filter 1300, the amplifier 1302 and the inverter 1304, as shown in FIG. 28. Since the transmitted pulses are at the transmitter master clock frequency, the output of the filter 1300 is at the same frequency and the receiver master clock signal at the conductor 1306 is applied directly to the reception clock 1308 which corresponds to the transmission clock 1071 of FIGS. 24 and 26. The output conductors 1338 and 1340 of the reception clock 1308 are applied to the NAND gate 1342 and, with the output at 1340 being inverted at 1344, to the NAND gate 1346. This latter gate has an output at the conductor 1348 which is inverted at 1349 so that the conductor 1446 provides the pulses 930 in FIG. 25.

The output of the gate 1342 is inverted at 1343 and applied to the binary 1350 whose output at the conductor 1352 provides one input to the NAND gate 1354. The output input to the gate 1354 is the receiver master clock output inverted at 1356. The output conductor 1358 from the gate 1354 is in the form of a pulse at the trailing edge of the shift pulse 930 to control the output of the serial-to-parallel converter 1204 (FIG. 27).

The serial-to-parallel converter 1204 consists of the shift register 1310,1312 as shown in FIG. 28, having the received pulse train at the conductor 1202 as an input. The master clock signal is inverted at 1386 to provide shift pulses at the conductor 1388 for the register 1310,1312. The parallel outputs of the register 1310,1312 are applied to the six binary devices 1314, 1316, 1318, 1320, 1322 and 1324 whose outputs at the conductors 1326, 1328, 1330, 1332, 1334 and 1336 are controlled by the shift pulses at the conductor 1358. Thus, the binaries are shifted out eight times per frame and to assure synchronization with the information received at the conductor 1202, the gate 1360 is used.

The gate 1360 has its output inverted at 1362 so as to provide an up output only when the synchronization word complement is present at the inputs to the binary devices 1314–1324. This output is differentiated by the capacitor 1364 in combination with the resistor 1366 and the diode 1367 to provide a reset pulse at the conductor 1370 which resets the divide-by-24 and divide-by-4 clocks of the receiver, which correspond to the transmitter clocks illustrated in FIGS. 15 and 14 respectively. This reset pulse also sets the Q output of the binary 1372 so that the output at the conductor 1374 goes up whereupon the master clock signal as inverted at 1376 causes the NAND gate 1378 to respond such that its output at 1380 goes down. The inverter 1382 provides a positive-going signal at the conductor 1384 to reset the reception clock 1308 and the negative-going signal at the conductor 1380 of course resets the binary 1372 and terminates itself and the reset pulse at the conductor 1384.

Figure 29:
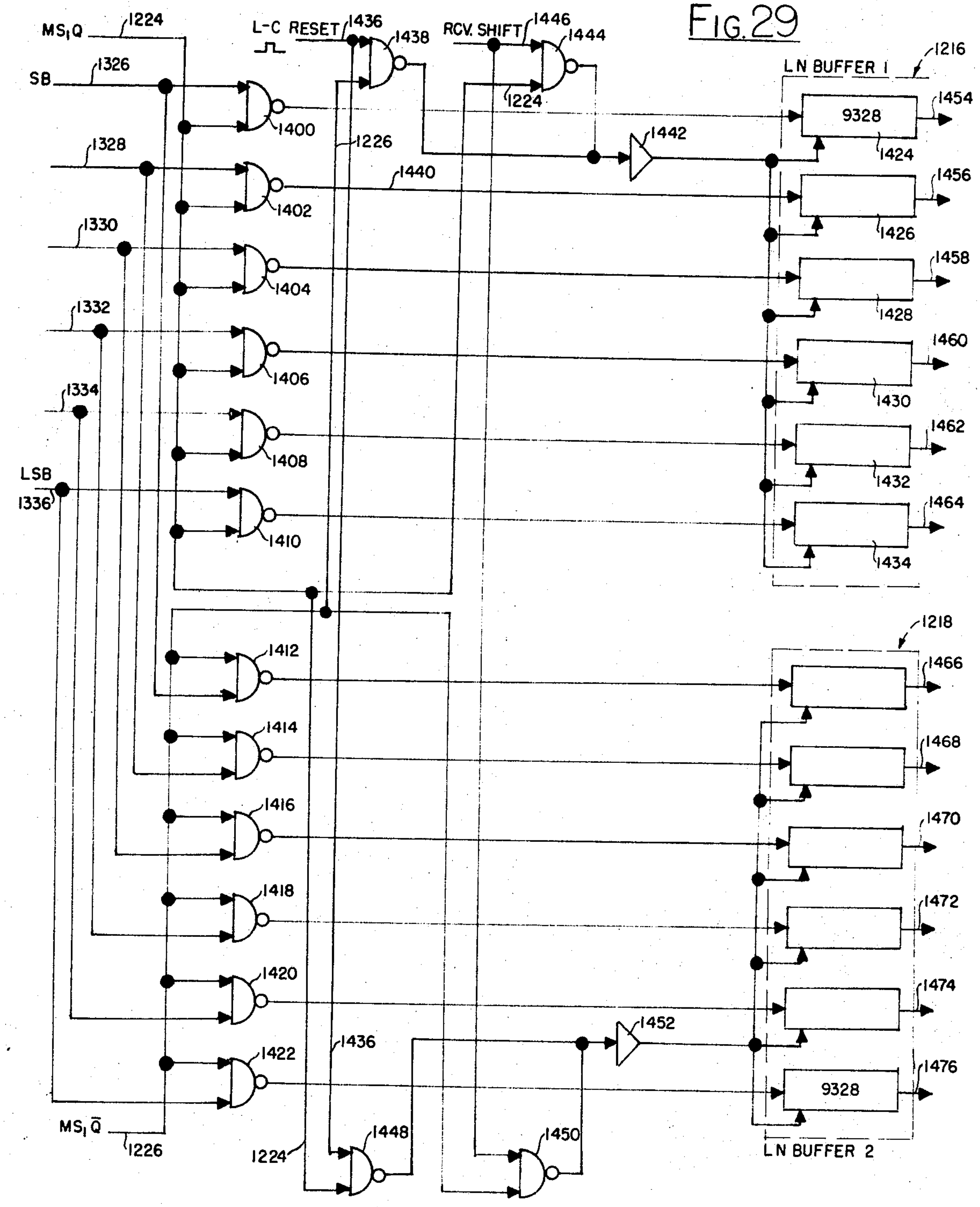
FIG. 29 is a circuit diagram illustrating the location number buffers and the input controls thereto at the receiver.

The location-number buffers and their input control are shown in FIG. 29. The output conductors 1326–1336 of the serial-to-parallel converter 1204 are connected to two banks of NAND gates, the first bank 1400, 1402, 1404, 1406, 1408 and 1410 of which is associated with the shift registers 1424, 1426, 1428, 1430, 1432 and 1434 which comprise one buffer, and the second bank 1412, 1414, 1416, 1418, 1420 and 1422 of which is associated with the shift registers 1466, 1468, 1470, 1472, 1474 and 1476 which comprise the other location-number buffer. The Q and $\overline{Q}$ outputs of the master switch, as provided by the conductors 1224 and 1226, control which bank of gates is operative to store the location numbers in the appropriate buffer. It will be recognized that conversion from the complements of the location numbers occurs at the outputs of the banks of control gates.

Shift control is provided by the two NAND gates 1438 and 1444, the former providing the asynchronous shifting of the location number words from one of the location number buffers while the latter provides the synchronous shifting of the location number words into the other location number buffer, and vice versa. That is to say, when the signal at the conductor 1224 is up while that at the conductor 1226 is down, the gates 1400–1410 and the gate 1444 are enabled to control insertion of the location number words into the buffer 1216, the gate 1438 being blocked. At the same time, the gates 1412–1422 and the gate 1450 are blocked while the gate 1448 is enabled to allow the asynchronous outshifting of the location number words stored in the buffer 1218.

The gate 1444 or 1450 provides shift signals under control of the signals at the conductor 1446 as described in conjunction with FIG. 28, whereas the gate 1438 or 1448 provides shift signals asynchronously at the conductor 1436 as hereinafter described.

Figure 30:
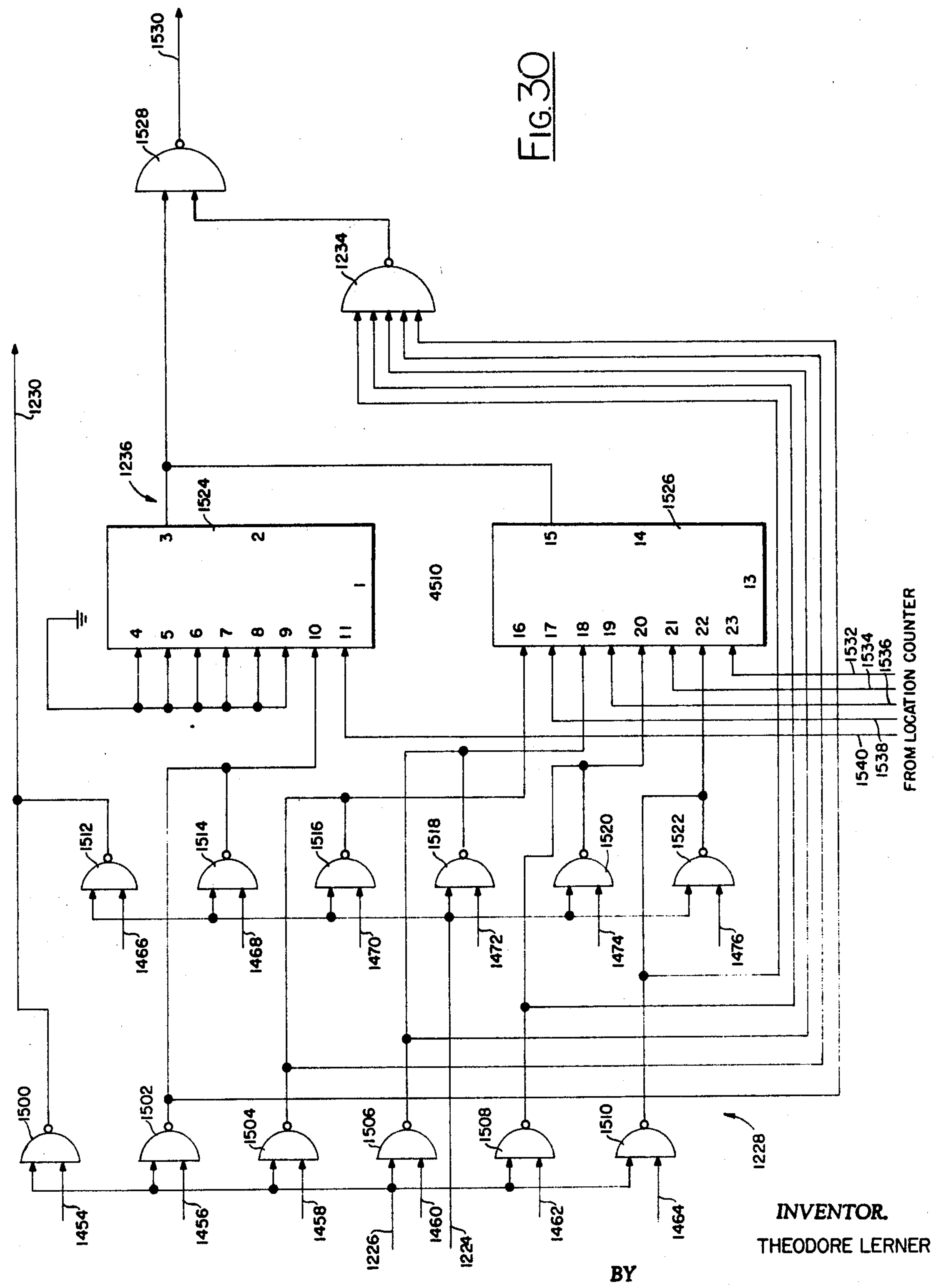
FIG. 30 is a circuit diagram illustrating the location number buffer output controls and the 5-bit comparator.

The output conductors 1454, 1456, 1458, 1460, 1462 and 1464 from the buffer 1216 are connected to a bank of NAND gates 1500, 1502, 1504, 1506, 1508 and 1510 to provide an output control for the buffer 1216 whereas the output conductors 1466, 1468, 1470, 1472, 1474 and 1476 of the buffer 1218 are connected to the bank of NAND gates 1512, 1514, 1516, 1518, 1520 and 1522 to provide an output control for the buffer 1218, see FIG. 30. The other inputs to these gates are from the Q and $\overline{Q}$ of the master switch as provided by the conductors 1224 and 1226. Thus, for the buffer which is storing, its bank of output control gates is blocked while the other bank is not, and vice versa.

The outputs of these banks of gates, exclusive of the gates 1500 and 1512, are connected to the comparator device 1236, which comprises the two solid state EXCLUSIVE OR devices 1524 and 1526. These devices also have the conductors 1532, 1534, 1536, 1538 and 1540 connected as inputs thereto, these latter conductors being from the location counter hereinafter described. The sixth or sign bits of the location number words are applied to the gates 1500 and 1512 and are connected through the conductor 1542 to the sample buffer input control hereinafter described. It is to be noted that the inputs to the comparator are the complements of the location numbers.

The operation is such that when the location counter, starting from the count of "one," reaches the value of the five bits of the location number word which has just been shifted out of the appropriate location number buffer, the comparator produces an output to the gate 1528. For all values of these five bits excepting the word 00000, which represents the frame synchronization signal, the gate 1234 will also have an up output to provide a negative-going signal at the conductor 1530. This signal, as will be seen in conjunction with FIG. 32, provides a preset signal to insert a "1" into the appropriate sample buffer.

Figure 31:
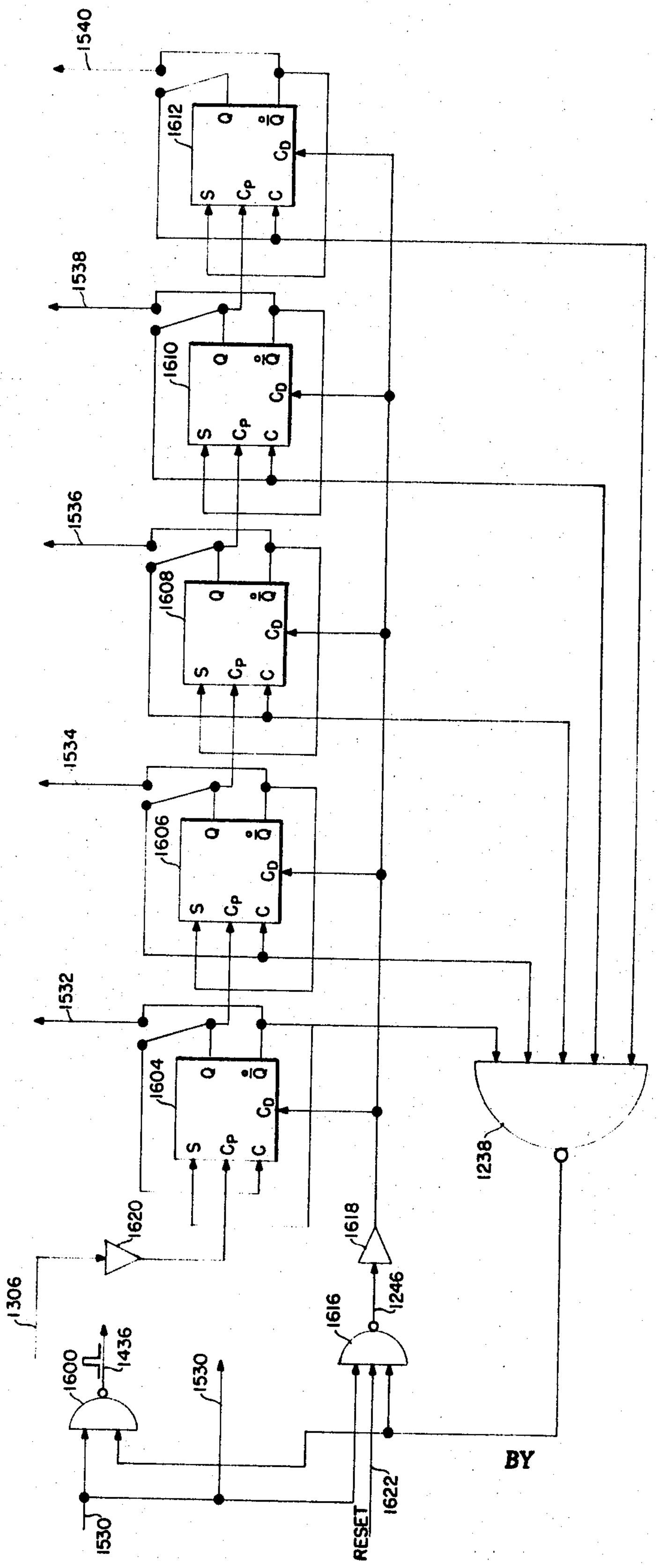
FIG. 31 is a circuit diagram showing the location counter, the "30" detector, the counter reset gate and the "insert 1" gate.

FIG. 31 illustrates the location counter, the detector 1238 (FIG. 27) and the shift gate 1600 which provides the shift signals at the conductor 1436 controlling the gates 1438 and 1448 of FIG. 29. When either the normally up output of the comparator at 1530 or the normally up output of the gate 1238 goes down, the asynchronous shift pulse is generated by the gate 1600. Thus, the location number buffer being shifted out is asynchronously shifted to present the next location number word to the comparator whenever either the comparator produces an output when the gate 1528 is not blocked (indicating that a "1" is to be inserted into the sample buffer) or the gate 1238, which detects the 30 consecutive zeroes, causes an output at the gate 1600. In either case, outshifting of the appropriate location number buffer occurs.

The counter consists simply of the five binary devices 1604, 1606, 1608, 1610 and 1612 connected as shown and having the output conductors 1532, 1534, 1536, 1538 and 1540 previously described and which are connected to the comparator (FIG. 30). As the comparator compares the complements of the location number words, the $\overline{Q}$'s of the counter must be connected to the comparator. The counter is reset to the count of "one" by the gate 1616 which has three inputs, one from the comparator gate 1528, one from the detector gate 1238, and the input conductor 1622, which is connected to the receiver clock system providing a frame-end reset pulse corresponding to the reset pulse 926 described in conjunction with FIG. 25 for the transmitter. Thus, the counter of FIG. 31 is reset under the corresponding conditions, the output of the gate 1616 being inverted at 1618.

Figure 32:
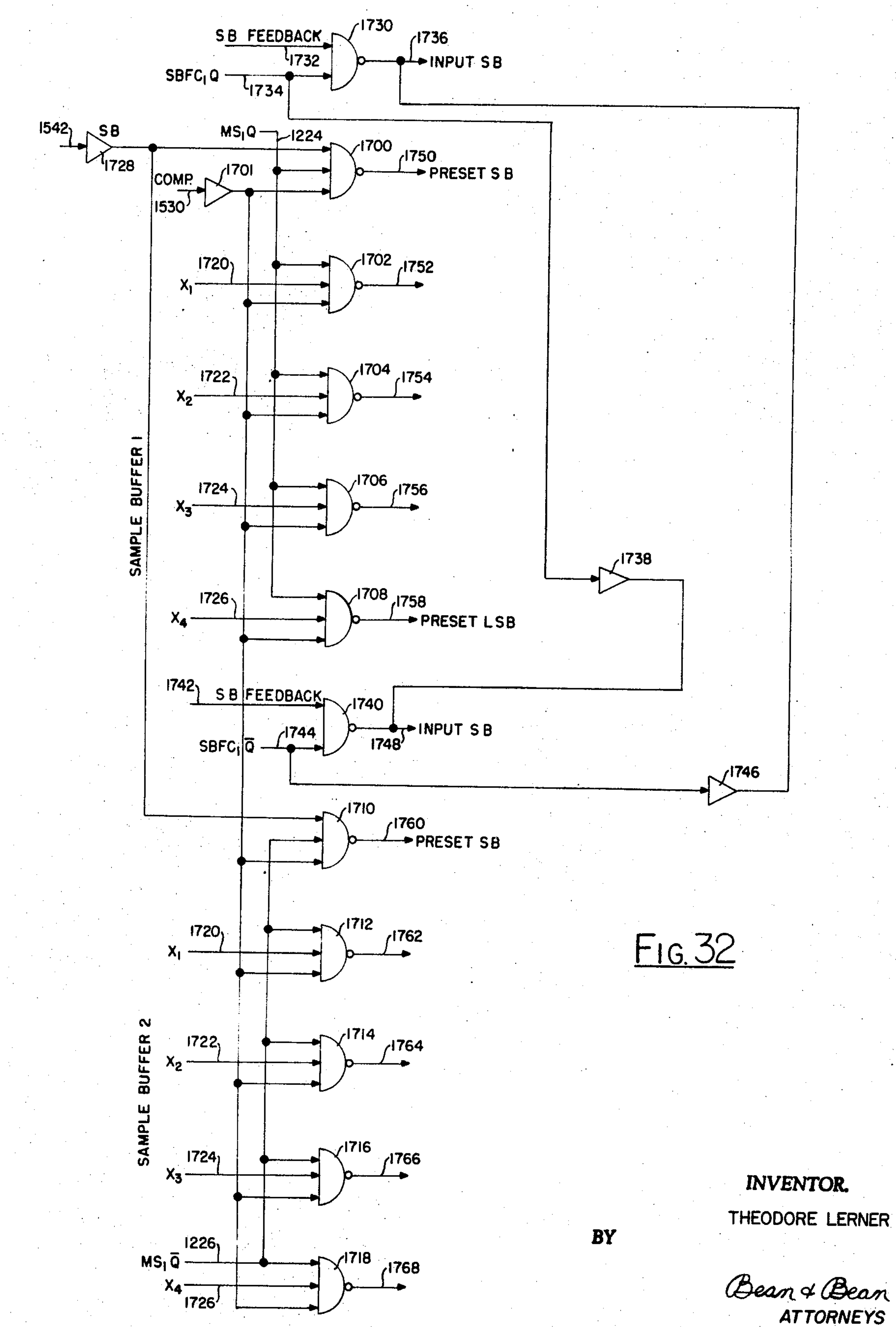
FIG. 32 is a circuit diagram illustrating the sample buffer input control for the receiver.

FIG. 32 illustrates the receiver sample-buffer input control. There are two banks of NAND gates, one bank 1700, 1702, 1704, 1706 and 1708, and the additional gate 1730 for the sign bit of one sample buffer, and another bank 1710, 1712, 1714, 1716 and 1718 and the additional gate 1740 for the sign bit of the other sample buffer. The gates 1700–1708 are either blocked or enabled by the master switch Q output at conductor 1224 while the opposite condition will prevail for the other bank of gates 1710–1718 under control of the master switch $\overline{Q}$ output at the conductor 1226.

The last four successive gates of each bank are also provided with the input conductors 1720, 1722, 1724 and 1726 which correspond to the transmitter clock outputs 288, 290, 292 and 294 of FIG. 16. In addition, all gates of each bank are connected through the inverter 1701 to the output conductor 1530 of the comparator gate 1528 (FIG. 30).

Figure 35:
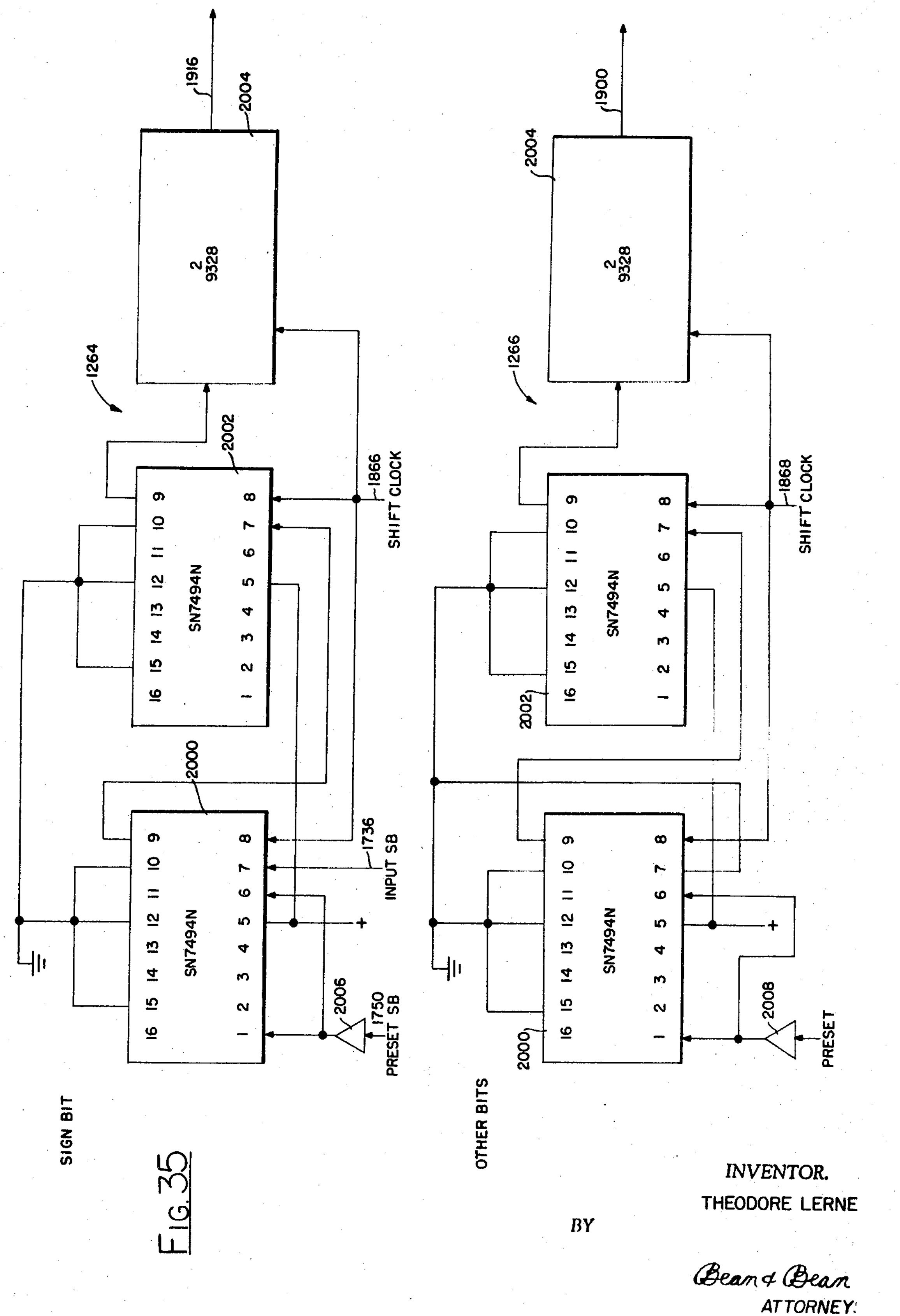
FIG. 35 is a diagram showing the representative sample buffers used in the receiver.

To describe the operation of the input control of FIG. 32, reference is had also to FIG. 35. FIG. 35 illustrates two of the shift registers of each sample buffer, there being one shift register for the sign bit ( the last bit of the sample words of FIG. 8*a*) as shown in the upper portion of FIG. 35, and four shift registers for each of the other bits of each reconstructed sample word, one of which registers as shown in the lower portion of FIG. 35. All of the registers are identical, each comprising solid state components 2000, 2002 and 2004, but having slightly different input connection as between that register for the sign bit and those for the other bits of each sample word.

For the sign bit register, the preset output conductor 1750 of the gate 1700 is connected thereto through the inverter 2006 and for the remainder of the registers, similar input connections are made through the inverters 2008 from the respective gate output conductors 1752, 1754, 1756 and 1758. Parallel connections are made from the gate output conductors 1760, 1762, 1764, 1766 and 1768 from the other bank of gates 1710–1718 to the registers of the other sample buffer. In each sign bit register, there is a further input connection from either the conductor 1736 or the conductor 1748 from the respective feedback gates 1730 and 1740. Thus, the proper sign bit is preset into the register from the conductor 1750 or 1760 whereas the recycling of the sign bit register content is effected through the conductor 1736 or 1748. The shift pulses for the sign bit register in FIG. 35 are applied by the conductor 1866 (FIG. 33) from the shift control circuit and, as will be understood, the sign bit registers are continuously shifted throughout the frames during which the corresponding buffers are being filled. The remainder of the registers of each sample buffer are sequentially shifted during the filling cycle. When the sample buffers are being shifted out, all five registers in each case are shifted out in parallel thereby to reconstruct the original sample word format.

Figure 36:
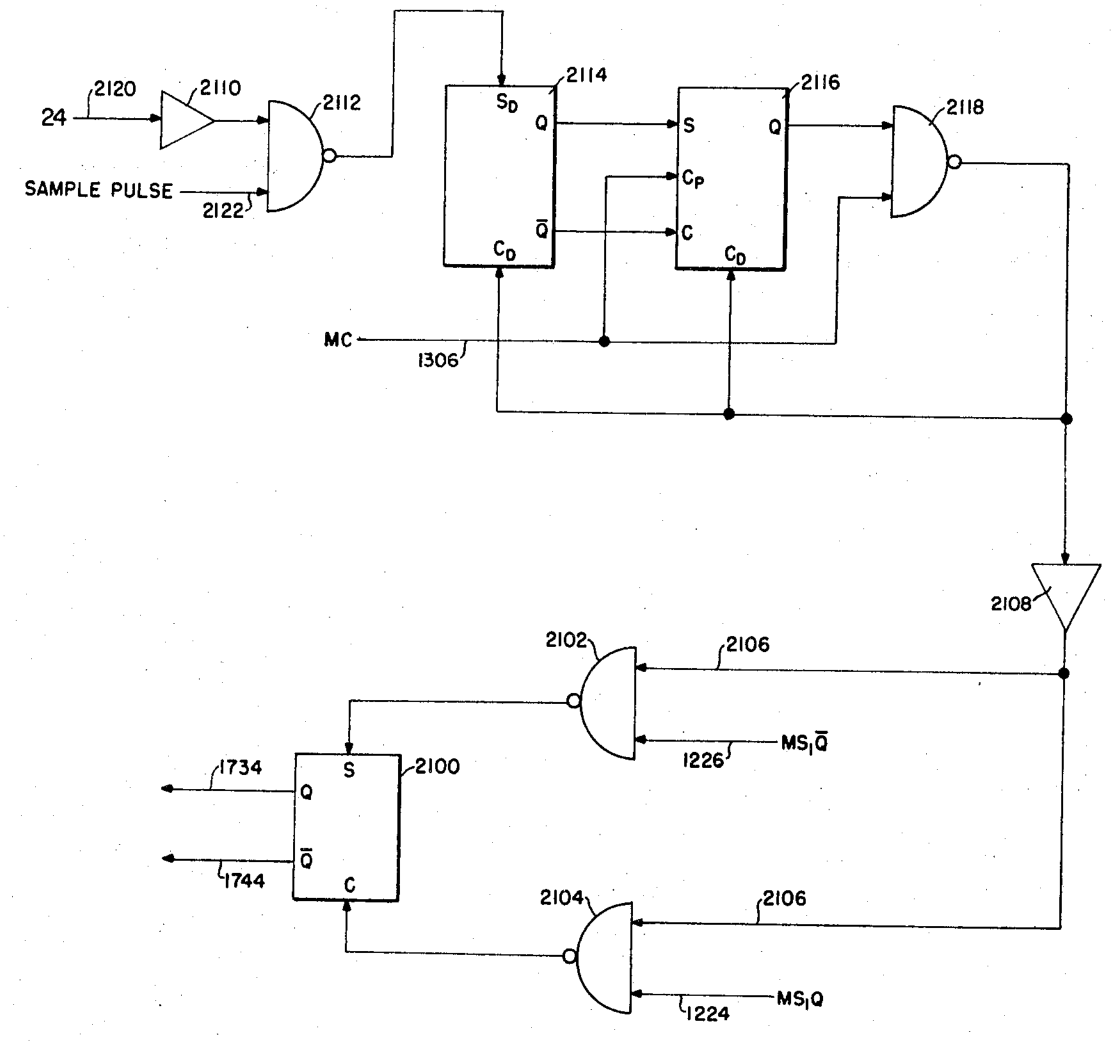
FIG. 36 is a circuit diagram illustrating the advanced master switch for the receiver.

An advanced master switch for the feedback control for each sign bit register is shown in FIG. 36. For this purpose, the Q and $\overline{Q}$ outputs 1734 and 1744 of the binary 2100 which control the feedback gates 1730 and 1740 of FIG. 32, are controlled by the gates 2102 and 2104. The latter gates are provided with the master switch $\overline{Q}$ and Q inputs respectively at the conductors 1226 and 1224 and are provided further with the normally down output at the conductors 2106 from the inverter 2108. At the receiver, the shifting of the sample buffer begins precisely at the start of the frame cycle (rising edge of the shift clock), which was not the case at the transmitter. The purpose of this circuit is simply to provide an advanced switch to ensure that the gates of the appropriate sample buffer are open when the shifting begins. The regular switch, used elsewhere, would cause missing of the first sign bit to be recirculated during the filling phase as well as missing of the first sample out during the emptying phase because there is a slight delay in the generation of the regular switch signal. As will be seen in conjunction with FIG. 34, the Q and $\overline{Q}$ signals at the conductors 1734 and 1744 control also the outputs of the sample buffers. The signal at the conductor 2120 is obtained from the 24th demultiplexing gate similarly to the signal at the conductor 732 in FIG. 19, and the signal at the conductor 2122 corresponds to the sample pulses 702 in FIG. 23, but derived from the receiver clock system.

Figure 33:
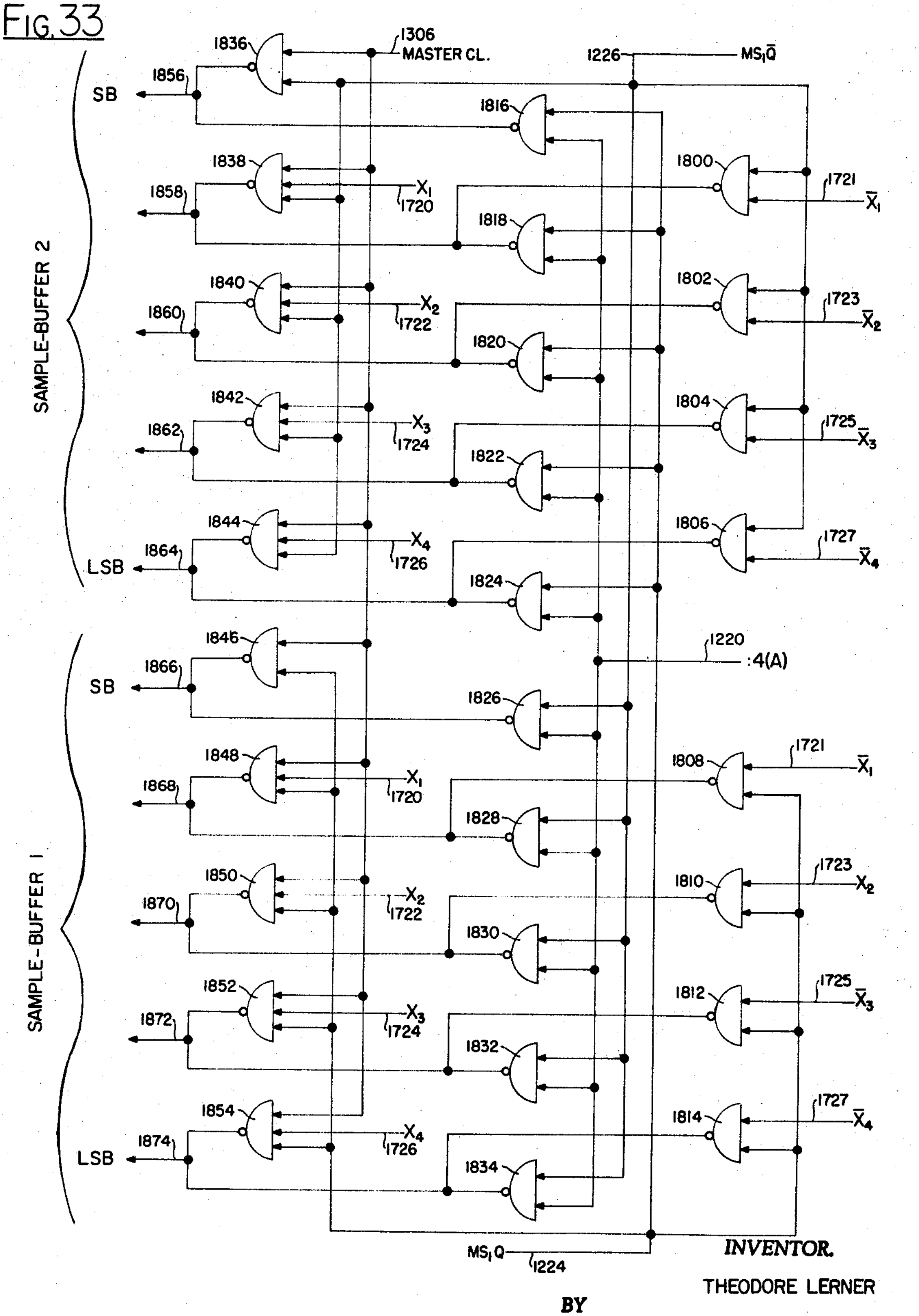
FIG. 33 is a circuit diagram of the sample buffer shift control.

The shift control is illustrated in FIG. 33 and will be seen to consist of six banks of NAND gates, the bank 1836–1844, the bank 1846–1854, the bank 1816–1824, the bank 1826–1834, the bank 1800–1806, and the bank 1808–1814. Three of these banks are enabled by an up output at the master switch conductor 1224 and three are blocked by the corresponding down output at the master switch conductor 1226, and vice versa. The operation is similar to that of FIG. 19 in the transmitter. That is, the receiver clock system output conductors 1720, 1722, 1724 and 1726 corresponding to the outputs of the conductors 288-294 of FIG. 16 and the clock output conductors 1721, 1723, 1725 and 1727 corresponding to the conductors 272–278 of FIG. 16 provide sequential control of the various gates. The two banks of gates 1836–1844 and 1846–1854 control the sequential storing of the sample buffer shift registers at the receiver master clock rate. Thus, while the bank of gates 1836–1844 are enabled by an up signal at the conductor 1226, shift pulses are continuously provided at the master clock rate at the conductor 1856 while, at the beginning of the frame, the signal at the conductor 1720 is also up so that the conductor also provides shift signals at the master clock rate. Then, for the next quarter cycle while the shift signals continue at the conductor 1856, the gate 1838 is blocked at 1720 and the gate 1840 is enabled at 1722. This sequential process continues until all of the sample buffer registers have been filled. As explained in conjunction with FIG. 19, when the signal at 1720 goes down, that at the conductor 1721 goes up to hold the output at the conductor 1858 down for the remainder of the cycle, and so on for the other gates.

While the above is going on, the two banks of gates 1846–1854 and 1808–1814 for the other sample buffer are blocked by the signal at the conductor 1224 whereas the gates 1826–1834 are enabled. The shift outputs therefore occur simultaneously at all of the output conductors 1866, 1868, 1870, 1872 and 1874 for the other buffer so as to shift the registers thereof out in parallel fashion at the clock rate at the conductor 1220.

During the storage cycle, returning to FIG. 32, the feedback gate 1730 or 1740 is enabled by the conductor 1734 or 1744 to allow recycling of the sign bit during the storage cycle.

Figure 34:
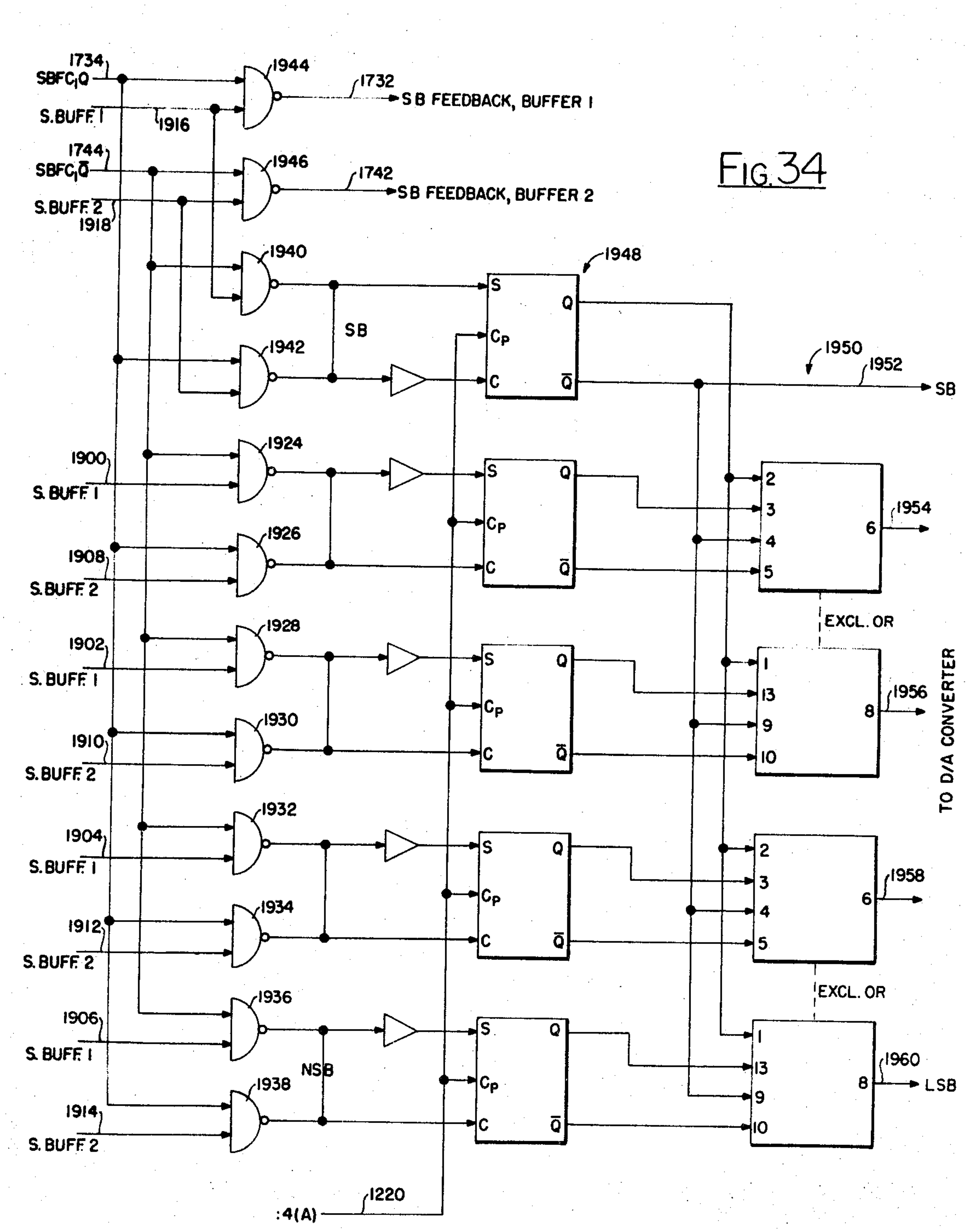
FIG. 34 is a circuit diagram illustrating the sample buffer output control and code converter.

The sample buffer output control as illustrated in FIG. 34 includes two banks of NAND gates, the bank 1940, 1924, 1928, 1932 and 1936, and the bank 1942, 1926, 1930, 1934 and 1938 connected respectively with the advanced master-switch conductors 1734 and 1744. Thus, one bank is enabled while the other is blocked. In FIG. 34, the sign bit register output at 1916 is connected both to the gate 1940 and to the feedback gate 1944 whose output at the conductor 1732 is applied as an input to the gate 1730 of FIG. 32. The corresponding sign bit register output conductor 1918 of the other sample buffer is likewise connected to gates 1942 and 1946, the latter of which has its output 1742 connected back as an input to the gate 1740 of FIG. 32. The conductors 1900, 1902, 1904 and 1906 and the conductors 1908, 1910, 1912 and 1914 are the output conductors of the remaining registers of the two sample buffers.

FIG. 34 also illustrates the code conversion circuitry necessary to render the system compatible with the digital-to-analog converter used, as described in conjunction with the analog-to-digital converter in the transmitter.

The code converter circuitry includes a bank of binary devices 1948 and a bank of EXCLUSIVE OR circuits 1950, the output of the code converter being at the conductors 1952, 1954, 1956, 1958 and 1960.

From the foregoing, it will be appreciated that a system according to this invention may incorporate either fixed or variable sampling rate to quantize samples from a large number of voice channels. These quantized samples are stored until a frame of them is obtained, whereafter the most significant bits of successive samples are processed first, then the next most significant bits, and so on, leaving the least significant bit for processing last. In this way, if there is insufficient time completely to process any given frame, the information content which may be lost is minimal. By employing a format wherein the last bit of each quantized sample is a sign bit, and by circulating this sign bit continuously while the bits of descending significance are being processed, an increased processing rate is obtained inasmuch as information about bits of significance and about a sign bit corresponding there is obtained simultaneously.

The processing of the bits of descending significance involves locating the presence of either "zeros" or "ones" and representing their locations as digital numbers with an additional digit representing the corresponding sign bit. A number of digital location numbers plus the sign bit in each case may be made to represent a complete frame of quantized voice sample signals, wherein the total number of bits encompassed by the location numbers plus their corresponding sign bits is significantly less than the total number of bits encompassed by the frame of quantized voice sample signals. The aforesaid format is chosen such that where all of the bits of descending significance, exclusive of the sign bit, of a quantized voice sample signal are "ones," the quantized signal stems from a voice signal of greatest amplitudes and is of decreasing amplitude as the most significant bit is a "zero," and so on. The roles of "ones" and "zeros" may of course be reversed.

At the receiving end, the location numbers plus their sign bits are used to reconstruct the original format and, ultimately, the original voice communication.

In the above embodiments, the principles have been described in conjunction with the multiplexing of voice signals. However, it will be understood that these principles may be applied equally well to the multiplexing of signals derived from other and different sources, so long as the statistical distribution of the information sought to be communicated is compatible with the systems disclosed. For example, the concepts herein may be used to multiplex a large number of video signals by choosing only some selected rate of grey level change as the threshold of information to be conveyed for each signal. In this instance, as with a large number of voice signals, the statistical distribution of information content will be low within any given time increment, even though the information content may be high for some of the signals. Similarly, a large number of uncorrelated analog signals may be multiplexed by choosing some rate of signal change as the information threshold.

Whereas only certain forms of the invention have been illustrated and described in detail hereinabove, it will be understood that various changes may be made therein without departing from the spirit of the invention or the scope of the following claims.

What is claimed is:

1. In a voice communication system having a plurality of voice input signals, means for providing successive formats of multiplexed digital sample words representative of said input signals, each format having a particular digit therein occurring a small number of times on the average based upon the statistical distribution of different amplitudes of the original voice signals, means for representing each format as a series of digital location words identifying the locations of said particular digits in each format, and receiver means for reconstructing each format and the voice input signals from each corresponding series of location words.

2. In a voice communication system as defined in claim 1 wherein said means for providing successive formats includes a plurality of parallel shift registers for storing the successive bits of said binary sample words in parallel, and said means for representing each format including means for reading out said shift registers in successive series.

3. In a voice communication system as defined in claim 2 wherein one bit of each binary sample word is a sign bit, the locations of said particular digit in each sample word except for said sign bits thereof together with said sign bits being represented simultaneously by said means for representing.

4. In a voice communication system as defined in claim 3 wherein said sign bits are read out of said shift registers in parallel with the other bits.

5. In a voice communication system, in combination,
conversion means for multiplexing a plurality of voice signals to provide a binary bit stream representative of said voice signals,
encoder means for converting successive frames of said bit stream into a series of binary location numbers, each frame consisting of $n$-bits and the number of bits of said binary location numbers corresponding to each frame being very much less than $n$,
means for transmitting said series of binary location numbers,
decoder means receiving the transmitted series of binary location numbers for converting said transmitted series of binary location numbers to reconstruct said binary bit stream, and
means for demultiplexing said reconstructed binary bit stream to reproduce said voice signals.

6. The voice communication system as defined in claim 5 wherein said encoder means includes means for counting the locations of similar bits occurring in each frame of said bit stream, and means for identifying said locations through said location numbers.

7. The voice communication system as defined in claim 5 wherein said encoder means includes means for determining the locations of similar bits occurring in each frame of said bit stream, and means for representing said locations as said location numbers.

8. In a voice communication system having first and second remotely located voice communication stations into each of which a large number of separate voice signals are channeled, the combination of:
first means associated with said first voice communication station for multiplexing the large number of voice signals channeled thereinto to produce a succession of multiple-bit digital sample words;
means for dividing said succession of sample words into successive group frames in which the time interval associated with each frame is sufficient to encompass a large number of sample words per frame;
means for transmitting the information content of each frame as a succession of digital location numbers in which the total number of bits contained in said location numbers is much lower than the number of bits per frame;
means associated with said second voice communication station for receiving said digital location numbers and reconstructing said successive frames therefrom; and
means associated with said second station for demultiplexing said reconstructed frame to reproduce the original voice signals therefrom.

9. In a communication system having first and second remotely located stations into each of which a large number of separate and uncorrelated signals are channeled, the combination of:
first means associated with each said first and said second communication stations for multiplexing the large number of uncorrelated signals channeled thereinto to produce a succession of multiple-bit digital sample words representing successive instantaneous values of said uncorrelated signals;
means for dividing said succession of sample words into successive sample word group frames in which the time interval associated with each frame is sufficient to encompass a large number of sample words;
means associated with each said first and second stations for representing and transmitting each said frame as a succession of digital location numbers in which the total number of bits contained in said succession of location numbers is much less than the total number of bits per frame;
means associated with each said first and said second stations for receiving said digital location numbers and reconstructing therefrom said successive sample word group frames transmitted from the other station; and
means associated with each said first and said second stations for demultiplexing said reconstructed frames to reproduce the original signals therefrom.

10. In a voice communication system having a great number of remotely situated communicating stations between pairs of which voice communication is to be established, the combination of:
means for multiplexing voice communication signals between pairs of said stations on a time staggered basis and dividing said multiplexed signals into successive digital frames, the time duration of each of which is sufficient to assure a large number of bits per frame; and
means for digitally representing each frame by a series of digital location words constituted by a number of bits much less than the number of bits per frame.

11. In a communication system including a large number of pairs of remotely located transmitting-receiving stations between each pair of which two-way communication is to be established; first means for processing and transmitting the signals of one of each of said pairs of stations in multiplexed digital form at a predetermined rate; second means for receiving said multiplexed signals and for demultiplexing them to establish communication in one direction between each pair of stations; third means for processing and transmitting the signals of the other of said pairs of stations in multiplexed digital form at said predetermined rate; and fourth means for receiving the multiplexed digital signals of said third means and for demultiplexing them to establish communication in the other direction between said pairs of stations; the improvement wherein:
said first and said third means each quantize the signal samples handled thereby to levels at which said predetermined rate would have to be exceeded substantially in order to provide useful communication quality between said pairs of stations, each said first and said third means including processing means for representing the quantized signal samples as a binary bit stream which may be transmitted at said predetermined rate; and
said second and said fourth means including means for reconstructing said quantized signal samples from said binary bit stream.

12. In a communication system including a large number of stations from which communications are to be transmitted over a single data link, the combination of:

means for converting successive frames of the large number of stations into formats in which multiplexed samples thereof are each in the form of a multiple-bit binary sample number, one bit of each number being a most significant bit, another bit of each number being a next most significant bit, and so on for all bits of each number except a remaining bit which is a sign bit;

processing means for locating the positions of similar bits, either "zeros" or "ones," in said format starting serially with the most significant bits and progressing serially therefrom in descending order of bit significance;

counter means for representing each of said positions as a multiple-bit binary location number having one bit thereof representing the sign bit corresponding to each sample number at which such a position occurs;

means for transmitting said binary location numbers over said data link; and receiver means for reconstructing said format from the transmitted binary location numbers.

13. In a communication system as defined in claim 12 including means for storing successive formats, said processing means operating on a completed format while the next format is being stored;

said processing means including means for recycling said sign bits as the series of descending significance bits are being processed.

14. In a communication system as defined in claim 13 wherein said means for converting stores said binary sample numbers in parallel and said processing means shifts said sample numbers out in series.

15. In a communication system as defined in claim 12 wherein said means for converting stores said binary sample numbers in parallel and said processing means shifts said binary sample numbers out in series.

16. In a communication system as defined in claim 12 including means for storing two groups of binary location numbers, said groups corresponding to successive formats and said means for transmitting including means for shifting out one group of binary location numbers while another group is being stored.

17. In a communication system as defined in claim 16 wherein said counter means includes means for generating and storing a unique synchronization number when fewer than a predetermined number of location numbers is generated per format.

18. In a communication system as defined in claim 17 wherein said receiver means includes a clock generated by said synchronization numbers.

19. In a communication system as defined in claim 18 wherein said receiver means includes means for storing successive groups of binary location numbers; means for shifting out one stored group of location numbers while another group is being stored; and counter and comparator means for reconstructing said formats from successive groups of binary location numbers.

20. In a communication system as defined in claim 19 wherein said means for transmitting transmits each location number in series.

21. In a communication system as defined in claim 20 including means for counting the number of binary location numbers generated per format, and means for generating filler numbers so that each group contains a predetermined number of numbers.

22. In a communication system as defined in claim 16 including means for counting the number of binary location numbers generated per format, and means for generating filler numbers so that each group contains a predetermined number of numbers.

23. In a communication system as defined in claim 17 including means for counting the number of binary location numbers generated per format, and means for generating filler numbers so that each group contains a predetermined number of numbers.

24. In a communication system as defined in claim 18 including means for counting the number of binary location numbers generated per format, and means for generating filler numbers so that each group contains a predetermined number of numbers.

25. In a communication system as defined in claim 19 including means for counting the number of binary location numbers generated per format, and means for generating filler numbers so that each group contains a predetermined number of numbers.

26. In a voice communication system, in combination:

means for representing a set of $k$ voice signals as a frame consisting of $kn$ bits;

means for specifying, with high probability, the information contained in said kn bits as a group of $rm$-bit numbers, where $rm$ is much less than $kn$;

means for receiving said group of rm-bit numbers;

means for reconstructing said frame from the received group of $rm$-bit numbers; and means for reproducing said set of $k$ voice signals from such reconstructed frame.

27. In a voice communication system as defined in claim 26 wherein the first mentioned means includes means for sequentially sampling said set of $k$ voice signals and representing each sample as an $n$-bit binary number in which the average member of either "ones" or "zeros" is made small; the second mentioned means specifying the locations within said frame of those bits whose average number is made small.

28. In a voice communication system as defined in claim 27 wherein said first mentioned means represents each voice sample as an $n$-bit number in which at least some of the bits thereof are of descending order of significance.

29. In a voice communication system as defined in claim 28 wherein said second mentioned means specifies the information in said $n$-bit numbers in sequential fashion according to the descending significance of the bits thereof.

30. In a voice communication system as defined in claim 26 wherein said first mentioned means represents each voice sample as an $n$-bit number in which at least some of the bits thereof are of descending order of significance.

31. In a voice communication system as defined in claim 30 wherein said second mentioned means specifies the information in said $n$-bit numbers in sequential fashion according to the descending significance of the bits thereof.

32. In a communication system having capability for transmitting digital data at a predetermined rate;

means for generating and storing samples of a large number of uncorrelated signals as multiple-bit sample words at a rate such that the total number of bits of the sample words generated within a given time period far exceeds the capability of transmission at said predetermined rate;

means for storing a selected plurality of multiple-bit location words within a time period equal to said given period, in which the total number of bits of said selected plurality of location words is within the capability of transmission at said predetermined rate;

means for shifting the bits of said sample words out of storage at a rate sufficiently greater than said predetermined rate as to encompass all of the bits thereof within a time period equal to said given period; and means for generating said location words from the outshifted sample word bits.

33. In the communication system as defined in claim 32 wherein said means for generating said location words comprises a counter driven at that rate at which said sample word bits are outshifted, detector means for detecting the presence of sample word bits of a kind whose probability of occurrence within said given time period is small, and means for generating at least some of the bits of a location word from said counter and for resetting said counter in response to detection of a sample bit of said kind.

34. In the communication system as defined in claim 33 wherein one bit of each sample word is recycled during outshifting, and including means for generating a bit of each location word from said one bit when said detector means is actuated.

35. In the communication system as defined in claim 34 wherein at least some of the bits of each sample word are of descending order of significance, and said means for shifting shifts out the bits of said sample words in such descending order of significance.

36. In the communication system as defined in claim 33 wherein at least some of the bits of each sample word are of descending order of significance, and said means for shifting shifts out the bits of said sample words in such descending order of significance.

37. In the communication system as defined in claim 32 wherein at least some of the bits of each sample word are of descending order of significance, and said means for shifting shifts out the bits of said sample words in such descending order of significance.

* * * * *